US012180770B2

(12) United States Patent
Castonguay et al.

(10) Patent No.: US 12,180,770 B2
(45) Date of Patent: Dec. 31, 2024

(54) AUTOMATED DOOR SYSTEM

(71) Applicant: Dana Heavy Vehicle Systems Group, LLC, Maumee, OH (US)

(72) Inventors: Sylvain Castonguay, Laval (CA); Mathilde Charmeau, Laval (CA); Ali Idrici, Laval (CA)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 317 days.

(21) Appl. No.: 17/646,433

(22) Filed: Dec. 29, 2021

(65) Prior Publication Data

US 2022/0205307 A1 Jun. 30, 2022

Related U.S. Application Data

(60) Provisional application No. 63/132,925, filed on Dec. 31, 2020.

(51) Int. Cl.
*E05F 15/00* (2015.01)
*B60R 25/24* (2013.01)
(Continued)

(52) U.S. Cl.
CPC .............. *E05F 15/74* (2015.01); *B60R 25/24* (2013.01); *E05B 81/56* (2013.01); *E05B 81/78* (2013.01); *E05B 83/12* (2013.01); *E05B 83/36* (2013.01); *E05F 15/76* (2015.01); *B60G 17/017* (2013.01); *B60R 25/2045* (2013.01); *B60R 25/2054* (2013.01); *B60R 25/257* (2013.01); *B60R 25/305* (2013.01); *B60R 25/31* (2013.01); *E05F 2015/767* (2015.01); *E05Y 2201/422* (2013.01);
(Continued)

(58) Field of Classification Search
CPC .......... E05B 83/36; E05B 81/78; E05B 81/56; E05B 83/12; E05F 15/76; E05F 15/74; E05F 2015/767; B60R 25/24; B60R 25/03; B60R 25/2045; B60R 25/257; B60R 25/2054; B60R 25/305; E05Y 2400/86; E05Y 2900/531; E05Y 2400/85; E05Y 2400/45; E05Y 2400/44; E05Y 2900/516; E05Y 2400/452; E05Y 2201/422; E05Y 2400/664; B60G 17/017
See application file for complete search history.

(56) References Cited

U.S. PATENT DOCUMENTS 9,598,238 B2 * 3/2017 Kadaba .................. B60P 3/007
10,717,432 B2 * 7/2020 Krekel ................. G06V 20/586
(Continued)

OTHER PUBLICATIONS

Castonguay, S. et al., "Automated Door System," U.S. Appl. No. 17/646,438, filed Dec. 29, 2021, 78 pages.
(Continued)

*Primary Examiner* — Chi Q Nguyen
(74) *Attorney, Agent, or Firm* — McCoy Russell LLP

(57) ABSTRACT

Methods and systems are provided for an automated door system for a vehicle. In one example, the automated door system may include a key fob configured with a transmitter. A set of sensors may be located at a door of the vehicle which may be communicatively linked to a vehicle control unit. A position of the key fob relative to the door may be monitored by the set of sensors to provide hands-free actuation of the door motor.

11 Claims, 30 Drawing Sheets

(51) Int. Cl.
*E05B 81/56* (2014.01)
*E05B 81/78* (2014.01)
*E05B 83/12* (2014.01)
*E05B 83/36* (2014.01)
*E05F 15/74* (2015.01)
*E05F 15/76* (2015.01)
*B60G 17/017* (2006.01)
*B60R 25/20* (2013.01)
*B60R 25/25* (2013.01)
*B60R 25/30* (2013.01)
*B60R 25/31* (2013.01)
*E05F 15/73* (2015.01)

(52) U.S. Cl.
CPC ....... *E05Y 2400/44* (2013.01); *E05Y 2400/45* (2013.01); *E05Y 2400/452* (2013.01); *E05Y 2400/664* (2013.01); *E05Y 2400/86* (2013.01); *E05Y 2900/516* (2013.01); *E05Y 2900/531* (2013.01)

(56) References Cited

U.S. PATENT DOCUMENTS

| | | | |
|---|---|---|---|
| 11,285,917 B1* | 3/2022 | Wisnia | H04K 3/92 |
| 11,946,308 B2* | 4/2024 | Castonguay | E05F 15/76 |
| 2002/0084887 A1* | 7/2002 | Arshad | B60R 25/04 |
| | | | 340/5.72 |
| 2015/0184984 A1* | 7/2015 | Johnson | F41J 1/10 |
| | | | 273/359 |
| 2017/0120867 A1* | 5/2017 | Beauvais | B60R 25/24 |
| 2018/0099712 A1* | 4/2018 | Bean | G08B 13/08 |
| 2018/0223587 A1* | 8/2018 | Spangler | B60N 2/20 |
| 2018/0283081 A1* | 10/2018 | Tamura | E05F 15/76 |
| 2020/0040638 A1* | 2/2020 | Ohashi | E05B 83/18 |
| 2020/0141176 A1* | 5/2020 | Ichinose | E05F 15/73 |
| 2022/0324415 A1* | 10/2022 | Salter | B60R 25/305 |

OTHER PUBLICATIONS

Castonguay, S. et al., "Automated Door System," U.S. Appl. No. 17/646,442, filed Dec. 29, 2021, 78 pages.

\* cited by examiner

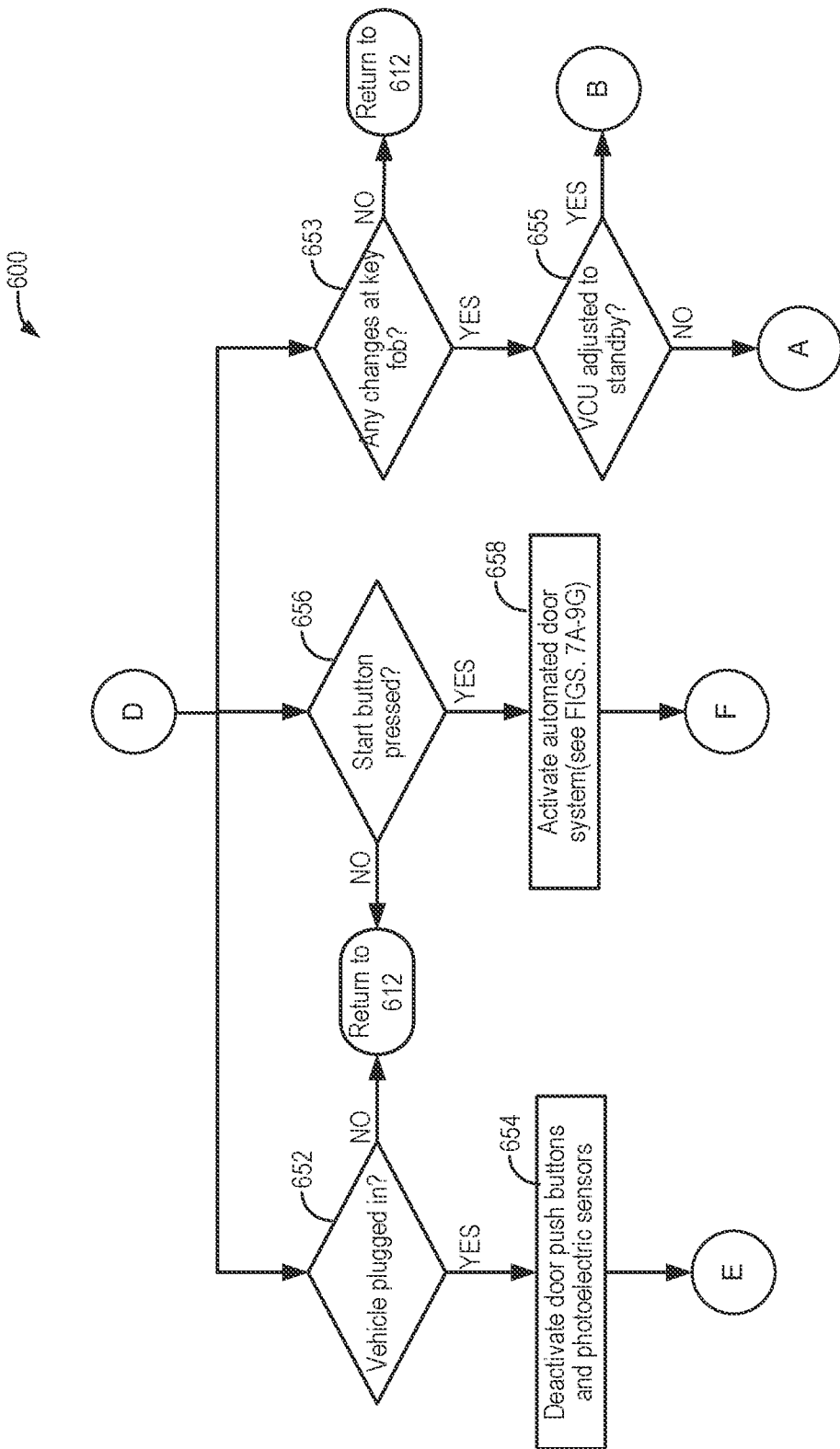

AUTOMATED DOOR SYSTEM

CROSS REFERENCE TO RELATED APPLICATION

The present application claims priority to U.S. Provisional Application No. 63/132,925, entitled "AUTOMATED DOOR SYSTEM", and filed on Dec. 31, 2021. The entire contents of the above-listed application are hereby incorporated by reference for all purposes.

TECHNICAL FIELD

The present description relates generally to hands-free door motor actuation in a vehicle.

BACKGROUND AND SUMMARY

Increasing interest in reducing fossil fuel combustion has led to efforts to provide electric medium-duty vehicles, such as delivery vehicles and other commercial vehicles. In order to electrically propel such vehicles, a large battery pack may be demanded. The battery pack may be positioned low in the vehicle, such as along a chassis of the vehicle, and may have a large footprint, resulting in packaging constraints along an underside of the vehicle. Furthermore, a low vertical positioning of a floor of the vehicle, and hence the chassis and the battery pack, may be desirable to enable efficient loading and unloading thereof.

A vehicle user may desire the ability to adjust a height of the floor/chassis of the vehicle, such as by directing the vehicle to move into a kneeling position. For example, in a kneeling position, the vehicle floor height above the ground may be lower relative to a nominal floor height above the ground. For example, a commercial vehicle may be used for transporting and delivering heavy items. As such, a user may desire to lower the vehicle floor to a kneeling position in order to facilitate a process of removing said heavy items. As another example, entering and exiting the vehicle may be made less challenging for a user when the vehicle is in a kneeling position, which may increase user safety. Overall, a commercial vehicle not equipped with a suspension system capable of lowering the vehicle to a kneeling position may decrease customer satisfaction.

Further, the vehicle user may also desire remotely actuated unlocking and opening of one or more doors of the vehicles, particularly when the vehicle user is carrying a load. Automatic unlocking of a door may reduce a likelihood of the vehicle user dropping the load in order to manually unlock the door, either by inserting a key in the door or activating a key fob. In addition, automated door opening may further mitigate difficulties in placing loads in the vehicle.

In one example, the issues described above may be addressed by an automated door system for a vehicle, comprising a key fob configured with a transmitter, a set of sensors located at a door of the vehicle, the set of sensors communicatively linked to a vehicle control unit (VCU) and configured to monitor a position of the key fob relative to the door, and wherein the set of sensors includes one or more of an RFID tag and a photoelectric sensor. In this way, the door may be locked/unlocked and or opened/closed when a user carrying the key fob approaches the door.

As one example, the set of sensors may provide information regarding whether the key fob is located inside or outside of the vehicle and which door of the vehicle the user is approaching. The status of the door may be adjusted in anticipation of a desired action of the user with respect to the door when the vehicle is in a target state, such as when the vehicle is parked, at least one door is unlocked, and the VCU is in a standby mode. A height of the vehicle floor may also be adjusted based on the state of the vehicle and anticipated entry or exit of the user.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 6A-6G show a flowchart of an example method for operating an automated door system of the vehicle based on a state of the vehicle, which may be operated in conjunction with lowering the vehicle.

DETAILED DESCRIPTION

Figure 1:
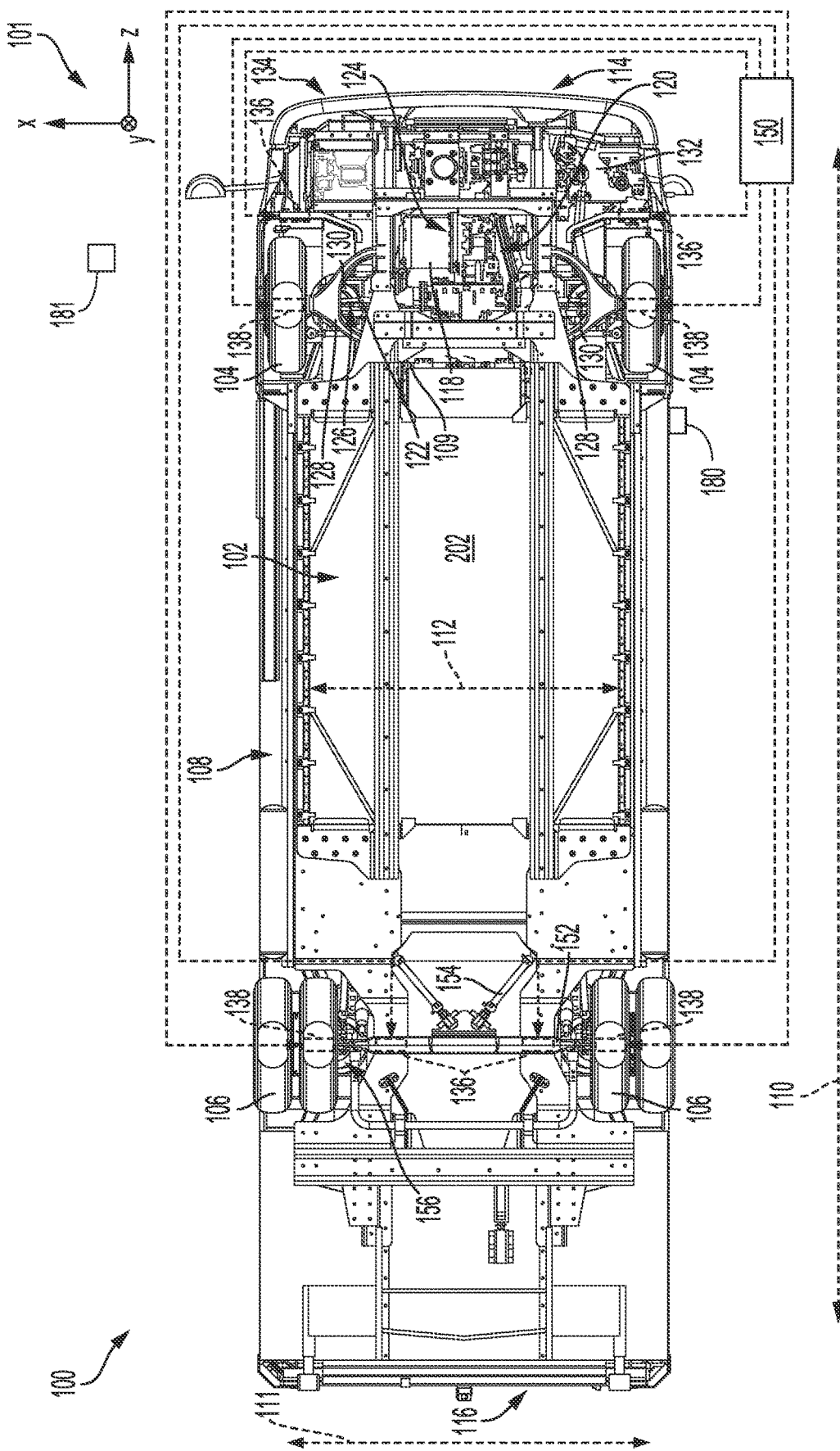
FIG. 1 shows a bottom view of an example of an electric commercial vehicle.
Figure 2A:
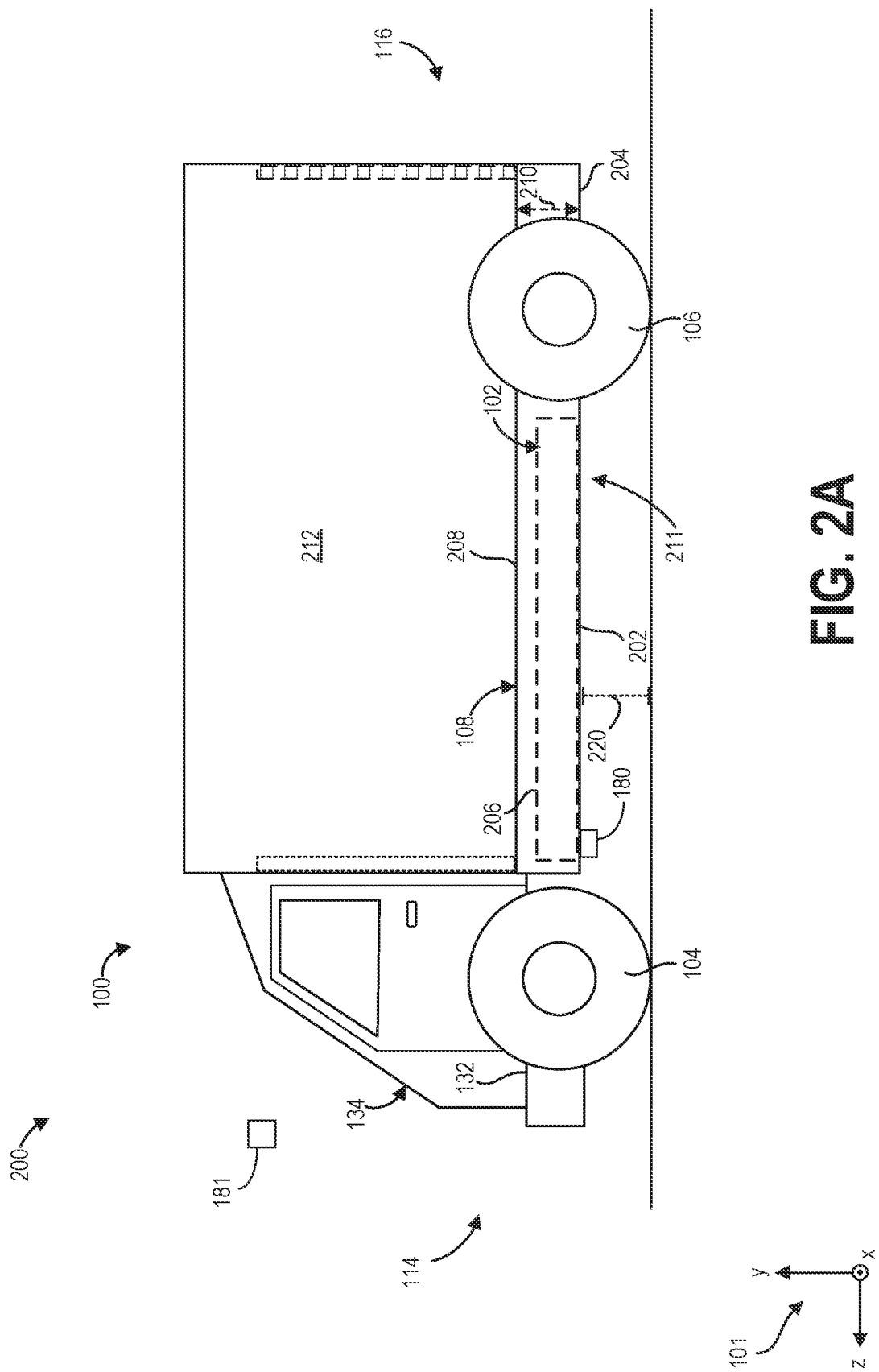
FIG. 2A shows the vehicle of FIG. 1 from a profile view in a nominal position.
Figure 2B:
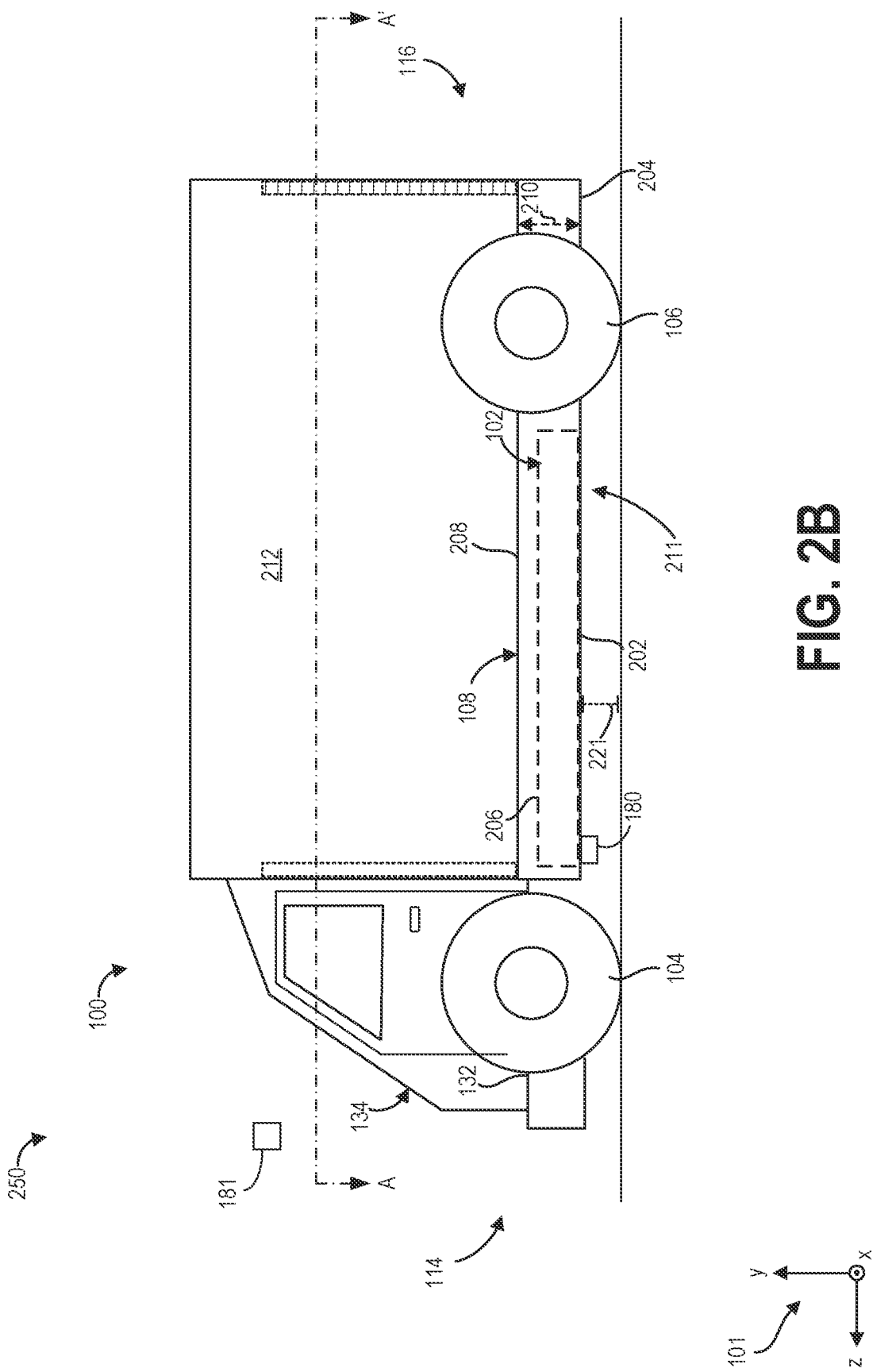
FIG. 2B shows the vehicle of FIG. 1 from a profile view in a kneeling position.
Figure 3:
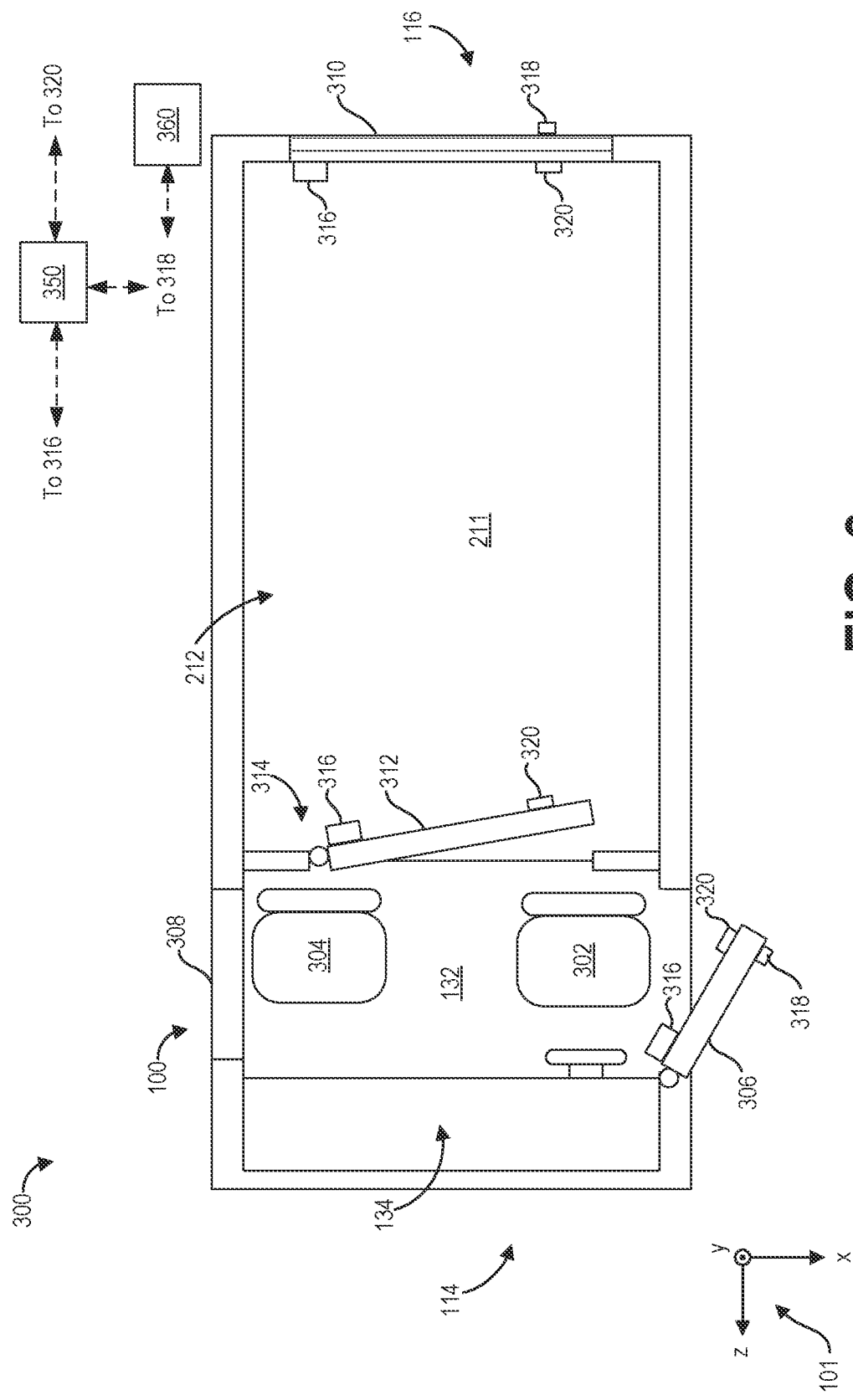
FIG. 3 shows the vehicle of FIG. 1 from a cut-away view illustrating locations of side, rear, and bulkhead doors of the vehicle which may be controlled by a key fob.
Figure 4:
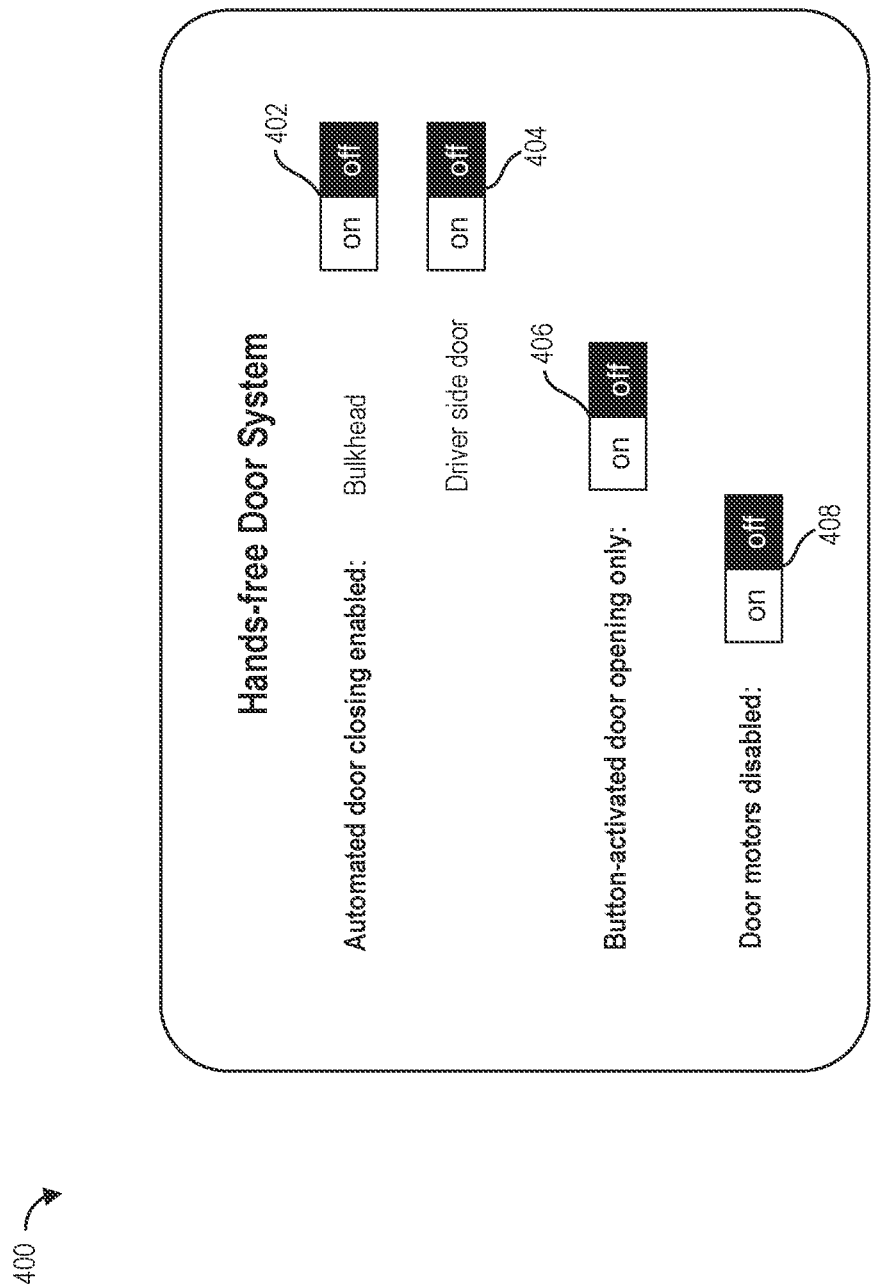
FIG. 4 shows an example of a user interface of the vehicle which may include controls for the doors of the vehicle in addition to the key fob.
Figure 5:
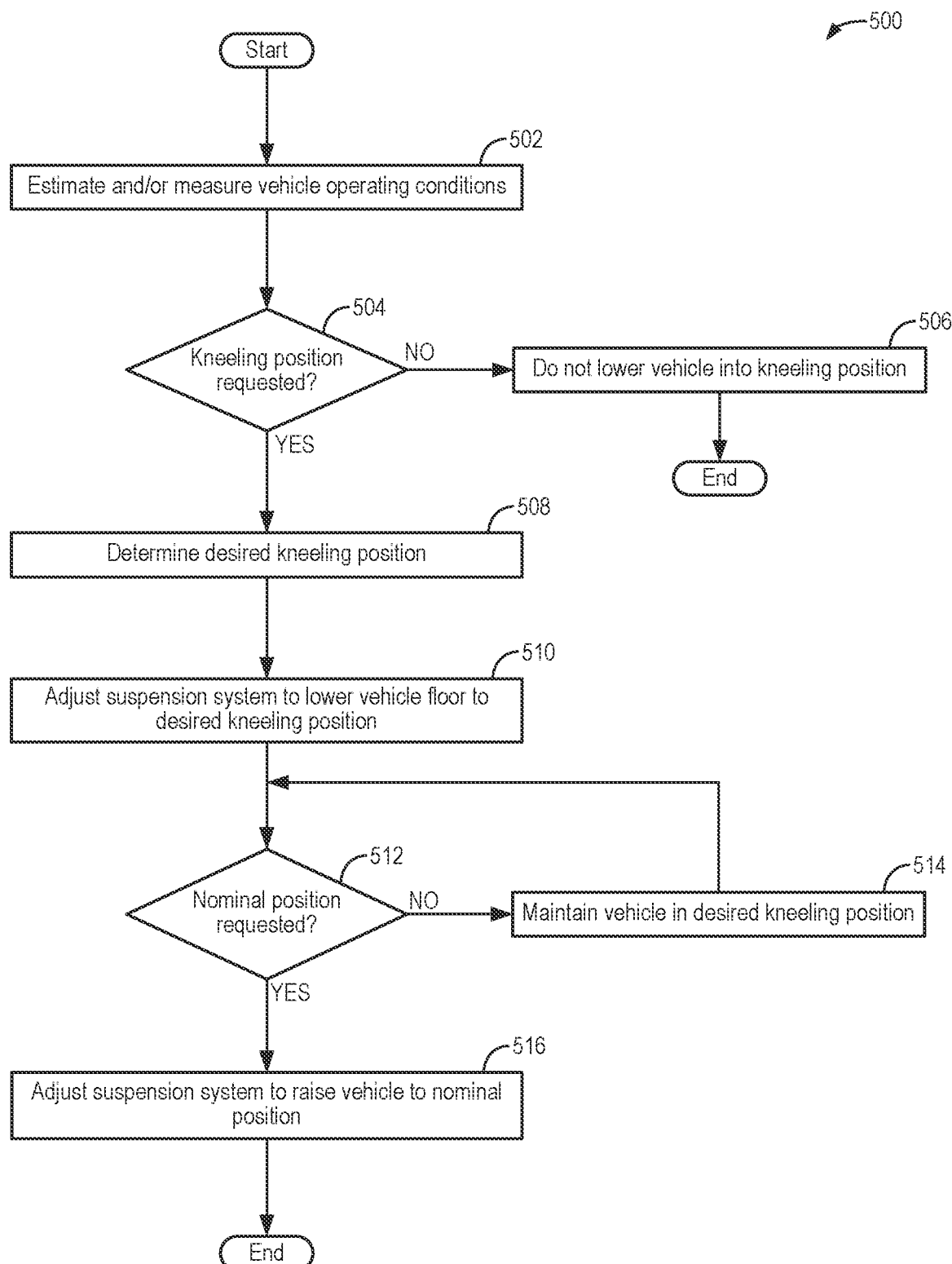
FIG. 5 shows a flowchart of an example method for lowering an electric commercial vehicle, such as the vehicle shown in FIGS. 1-3, into a kneeling position to accommodate a user.

The following description relates to systems and methods for an automated door system in an electric commercial vehicle as well as height adjustment of a chassis of the vehicle. For example, the vehicle may have a skateboard frame, and may lower into a kneeling position based on sensor input indicative of a desired vehicle position, in order to allow a user to exit and/or enter the vehicle, and to facilitate loading and unloading the vehicle. In some examples, a floor of the vehicle may be a chassis with an integrated battery pack and a skateboard frame, as shown in FIG. 1. In one example, the vehicle of FIG. 1 may be in a nominal operating position (e.g., not in a kneeling position), as shown in FIG. 2A, and may be further lowered to one or more kneeling positions in response to sensor input. An example of a kneeling position of the vehicle is depicted in FIG. 2B and an example of a method for adjusting the vehicle into the one or more kneeling positions is shown in FIG. 5. Loading/unloading of the vehicle, as well as ease of entry/exit of the user may be further accommodated by adapting the vehicle with the automated door system which enables hands-free unlocking and opening of vehicle doors in addition to manual manipulation of input mechanisms for unlocking/locking of the doors. As illustrated in FIG. 3, the vehicle may include a plurality of doors, including a side door, a rear door, and bulkhead door. Control of the doors may be enabled by a combination of a radio-frequency identification (RFID) system and a photoelectric system which relay data to and from control devices of the vehicle, including a key fob and a dashboard user interface. An example of the dashboard user interface is depicted in FIG. 4. A method for operating the automated door system may depend on a status of the vehicle, as shown in FIGS. 6A-6G. Examples of methods for control of the rear door, the bulkhead door, and the driver side door of the vehicle are shown in FIGS. 7A-7C, FIGS. 8A-8G, and FIGS. 9A-9G, respectively.

Turning now to FIG. 1, a commercial vehicle 100 may have an electrical system configured with a battery pack 102 as a prime mover providing electrical energy for propulsion. A set of reference axes 101 are provided for comparison between views shown, indicating a y-axis, an x-axis, and a z-axis. In one example, the y-axis may be parallel with a direction of gravity and a vertical direction, the x-axis parallel with a horizontal direction, and the z-axis parallel with a transverse direction and a longitudinal axis of the vehicle 100, e.g., parallel with a length 110 of the vehicle 100. The view shown in FIG. 1 is a z-x planar view, as shown by reference axes 101. The vehicle 100 may be one of a variety of vehicle types, including light commercial vehicles, buses of different sizes, medium- and commercial trucks, vocational vehicles, etc. The battery pack 102 may be an energy storage device configured to deliver electrical power to various components of the electrical system of the vehicle 100 including supplying current to motors coupled to front wheels 104 and/or rear wheels 106 of the vehicle 100. The battery pack 102 may extend along a chassis 108 of the vehicle 100, between the front wheels 104 and the rear wheels 106, along a portion of the length 110 of the vehicle 100. A width 112 of the battery pack 102 may be similar to a distance between innermost wheels of the rear wheels 106.

In one example, the chassis 108 of the vehicle 100 may be a skateboard chassis 108 in which the battery pack 102 is integrated, e.g., forming a continuous unit with the skateboard chassis 108. The skateboard chassis 108 may extend along a greater portion of the length 110 of the vehicle 100 than the battery pack 102, from a point behind the front wheels 104 to a rear end 116 of the vehicle. However, in other examples, the skateboard chassis 108 may vary in length, e.g., the skateboard chassis 108 may be shorter than depicted in FIG. 1. In one example, as shown in FIGS. 2A and 2B, the skateboard chassis 108 may be a platform forming a floor 211 of the vehicle 100. The skateboard chassis 108 may be formed of a solid, durable, strong material, such as aluminum, steel, fiber-reinforced materials, and/or other composite materials, able to withstand and support large loads.

The battery pack 102 may be embedded in the skateboard chassis 108, e.g., enclosed in a recess in the skateboard chassis 108, to form a single integrated structure, and may therefore also be incorporated into the floor 211 of the vehicle 100. As shown in FIGS. 2A and 2B, a bottom face 202 of the battery pack 102 may form a portion of a bottom surface 204 of the skateboard chassis 108. The battery pack 102 may therefore be biased within the skateboard chassis 108 at a lower region, with respect to the y-axis, of the skateboard chassis 108. However, in other examples, the battery pack 102 may instead be biased at an upper region of the skateboard chassis 108 with an upper face 206 of the battery pack 102 forming a portion of an upper surface 208 of the skateboard chassis 108. In yet other examples, the battery pack 102 may extend along a majority of a height 210 of the skateboard chassis 108.

The skateboard chassis 108 may provide various benefits with respect to efficient assembly and packaging of the vehicle 100. For example, the skateboard chassis 108 may be readily scalable, allowing different types of vehicle bodies to be attached. A low vertical (e.g., with respect to the y-axis) positioning of the battery pack 102 in the vehicle 100 may provide even and balanced weight distribution without adversely affecting an overall balance of the vehicle 100 (depending on a height of a payload of the vehicle 100). Rather, in some examples, the low vertical positioning of the battery pack 102 may even increase the overall balance of the vehicle 100. Furthermore, locating the battery pack 102 in a recess of a vehicle floor 211 may increase cabin space while enclosing the battery pack 102 in a durable, rigid structure that supports and shields the battery pack 102 from contact with debris, moving vehicle components, etc.

In some instances, the vehicle 100 may be operated to transport cargo, which may demand manual loading and unloading of objects from the storage compartment 212, as shown in FIGS. 2A and 2B, positioned above the skateboard chassis 108. In order to increase an ease of loading/unloading, the vehicle floor 211 may be maintained as low as possible, with respect to the y-axis, while providing sufficient ground clearance. Furthermore, as shown in FIG. 1, a width of the skateboard chassis 108, as defined along the x-axis, may be similar to a width 111 of the vehicle 100 to maximize a storage capacity of the storage compartment 212 except at a region between the rear wheels 106 where the width of the skateboard chassis 108 may be similar to the distance between the innermost rear wheels 106. Further still, the vehicle chassis may be further lowered in at least one kneeling position in response to one or both of a user input and a vehicle operating condition, in order to facilitate loading and unloading of objects from the storage compartment 212, such as will be described with respect to the method of FIG. 4.

As shown in FIG. 1, the skateboard chassis 108 may extend from a mid-point along the length 110 of the vehicle 100, behind the front wheels 104 to the rear end 116 of the vehicle 100. The low positioning of the skateboard chassis 108, e.g., as the floor of the storage compartment 212, as well as the width of the skateboard chassis 108 may preclude coupling a drive train to a rear axle 152 of the vehicle 100. As such, the vehicle 100 may be configured with front-wheel drive due to available packaging space between the front wheels 104, allowing implementation of a powertrain 124 and a drive train 120 at the front wheels 104.

The powertrain 124 includes a motor 118 arranged between a front end 114 of the vehicle 100 and a front edge 109 of the skateboard chassis 108, as well as between the front wheels 104. The motor 118 may be configured to receive electrical power from the battery pack 102. In one example, the motor 118 may be a motor/generator, able to convert mechanical energy to electrical energy to recharge the battery pack 102. The motor 118 may be coupled to a drive train 120 which, in turn, is coupled to drive shafts 122 of the front wheels 104. The drive train 120 may include components such as a transmission and a differential. The powertrain 124 may further include a torque converter arranged between the motor 118 and the transmission when the transmission is automatic, or a clutch between the motor 118 and the transmission when the transmission is manual or single-gear direct drive. Thus, electrical power drawn from the battery pack 102 by the motor 118 may be converted to torque to drive rotation of the front wheels 104 via the drive train 120. The rear wheels 106 may be trailer wheels rotated together on the rear axle 152.

The vehicle 100 may include a first, or front, suspension system 126 at the front wheels 104 to allow relative motion between a floor 132 of a vehicle cabin 134 and the front wheels 104. The vehicle cabin 134 may be a passenger compartment positioned above and supported by the front wheels 104, as shown in FIGS. 2A-2B. As depicted in FIG. 1, the floor 132 of the vehicle cabin 134 may extend between the front edge 109 of the skateboard chassis 108 and the front end 114 of the vehicle 100 and across the width 111 of the vehicle 100. In some examples, the floor 132 of the vehicle cabin 134 may be positioned vertically higher, e.g., along the y-axis, than the skateboard chassis 108, providing greater ground clearance below the vehicle cabin 134 than below the skateboard chassis 108, as well as space for the powertrain 124 and the drive train 120 between the front wheels 104. The floor 132 of the vehicle cabin 134 may be continuous, in one example, with the skateboard chassis 108, so that adjustment of a vertical position of the chassis and the floor 132 of the vehicle cabin 134 occurs in unison. As such, the floor 132 of the vehicle cabin 134 may be included in the vehicle floor 211.

The front suspension system 126 may include independent double wishbone or A-arm suspensions 128 having a pair of wishbone arms stacked vertically along the y-axis at each of the front wheels 104. When configured as double wishbone suspensions 128, the front suspension system 126 may be readily tuned and optimized, providing a more lightweight and compact mechanism than other types of suspension configurations, such as a MacPherson strut, a multi-link suspension, etc. Furthermore, the double wishbone suspensions may provide greater clearance for the drive shafts 122 of the front wheels 104.

The vehicle 100 may further include a second, or rear, suspension system 156 at the rear wheels 106 to allow relative motion between the skateboard chassis 108 and the rear wheels 106. The rear suspension system 156 may include a simpler configuration (e.g., having fewer components) than the front suspension system 126, as the rear wheels 106 may operate with decreased pivoting motion in the x-z plane relative to the front wheels 104 (e.g., the rear wheels 106 may not be steering wheels, and therefore may not pivot substantially during turning of the vehicle 100).

In one example, each of the front and rear suspension systems 126, 156 may be configured as an air suspension system, where an air pump or compressor may be utilized to power each of the front and rear suspension systems 126, 156. Air may be pumped into one or more flexible, expandable devices, thereby inflating the devices and raising the skateboard chassis 108 from a front axle assembly (e.g., the drive shafts 122, the powertrain 124, the drive train 120) or a rear axle assembly (e.g., the rear axle 152) of the vehicle 100. Implementing the air suspension systems 126, 156 in the vehicle 100 may provide a smoother ride quality than steel spring suspension systems or leaf spring suspension systems. Further, by raising and lowering each of the front suspension system 126 and the rear suspension system 156, the vehicle may be transitioned between a nominal position and at least one kneeling position, wherein the vehicle floor 211 (as shown in FIGS. 2A-2B) is lower to the ground in the at least one kneeling position, relative to the nominal position. As an example, air may be pumped out of the one or more flexible, expandable devices to lower the skateboard chassis 108 into a first kneeling position, and air may be pumped into the one or more flexible, expandable devices to raise the skateboard chassis 108 back to a nominal position. The first kneeling position may be lower to the ground, relative to the nominal position. By enabling the vehicle to adjust in a kneeling position, the suspension system may increase customer satisfaction, and ease of use.

The flexible, expandable device may be an air spring 130 (seen in FIG. 1 positioned at the front suspension system 126, but also present in the rear suspension system 156) with at least a portion of the air spring 130 formed of a flexible, durable material, such as rubber, and readily inflated and deflated. Inflation/deflation of the air spring 130 may be adjusted based on at least one height sensor 136 coupled to the floor 132 of the vehicle cabin 134 and/or the skateboard chassis 108 to measure a vertical position of the floor 132 and/or skateboard chassis 108 proximate to the air spring 130. A pressure of each air spring 130 may be monitored by a pressure sensor 138. The at least one height sensor 136 and the pressure sensors 138 may be communicatively coupled to a controller 150, which may include a vehicle control unit (VCU). Thus, the vertical position of the floor 132 and/or the skateboard chassis 108 may be monitored via the at least one height sensor 136 and the pressure sensors 138.

The controller 150 may be a computing device, such as a microcomputer that includes a processor unit, a non-transitory computer-readable storage medium device, input/output ports, memory, and a data bus. The computer-readable storage medium device included in the controller 150 may be programmable with computer readable data representing instructions executable by the processor for performing various control routines and methods. The controller 150 may receive requests from an operator of the vehicle 100 to perform the various control routines and methods. For example, the controller 150 may receive requests from the operator to lower or raise the floor 132 of the vehicle cabin 134 and/or the skateboard chassis 108 by simultaneously or independently compressing or expanding the air spring 130. As another example, the controller 150 may determine to lower or raise the floor 132 of the vehicle cabin 134 and/or the skateboard chassis 108 in response to one or more operating conditions, such as a signal from a proximity sensor, a camera feed, a key fob proximity signal, a motion sensor, etc.

The controller 150 may receive various signals from a plurality of sensors of the vehicle 100 (e.g., the at least one height sensor 136, the pressure sensors 138, etc.) and utilize the information to operate various actuators of the vehicle 100 based on the instructions. For example, the controller 150 may receive data from the at least one height sensor 136 to determine whether the floor 132 of the vehicle cabin 134 is positioned sufficiently high enough to circumvent contact between the floor 132 and the drive shafts 122 at the front wheels 104 when the vehicle 100 encounters uneven terrain. The vehicle 100 may include various other sensors not shown in FIG. 1 to monitor various operating conditions, such as vehicle sensors to monitor parameters such as pressure, temperature, speed, etc., amongst others.

For example, vehicle 100 may include one or more sensors for determining a position of a user during an unloading process, such as a proximity sensor, a motion sensor, a key fob, and the like. As one example, a key fob 181 may be taken in and out of the vehicle cabin. The key fob 181 may include a wireless communication module, such as a Near Field Communication (NFC) module, in order to communicate with the controller 150 via an NFC connection. For example, the key fob may transmit a signal from a button press via the NFC connection. Further, based on a signal strength of the NFC connection, the controller 150 may determine a key fob proximity, in order to determine a key fob location. For example, controller 150 may determine a user proximity to the vehicle based on the key fob location. Further, vehicle 100 may include one or more proximity and/or motion sensors, such as proximity and motion sensor 180. Proximity and motion sensor 180 may be positioned near a driver's side door of the vehicle, and as such, may be used to determine a driver's proximity to the driver's side door. Further, in some examples, the proximity and motion sensor 180 may be configured to detect certain gestures. For example, a user of the vehicle may perform a gesture (e.g., with a hand or a foot), which the proximity and motion sensor 180 may detect and transmit to the controller 150 as an input.

In some instances, as described further below with respect to FIGS. 2A-2B, proximity and motion capabilities may be separated into individual sensing systems, such as a RFID-based system and a photoelectric system. The proximity of the key fob may be determined by, for example, the RFID-based system. When the key fob is within a threshold proximity of a door, detected based on a signal between a RFID tag, which may be coupled to the door, and a RFID reader, which may be incorporated into the key fob, adjustments to a status of the door, as well as the vertical height of the floor 132 of the vehicle cabin 134, may be executed.

Further, the controller 150 may receive signals from one or more cameras mounted to the vehicle. For example, as shown in FIG. 3, one or more cameras may be mounted to an exterior of the vehicle and/or an interior of the vehicle cabin, and a video feed from each of the one or more cameras may be monitored by the controller. Further, in some examples, the vehicle may include at least one microphone for receiving voice commands (not shown). In some examples, the microphone may be configured for voice recognition of users.

FIGS. 2A-2B show profile views of vehicle 100 of FIG. 1. Like components are numbered similarly as in FIG. 1 and will not be reintroduced. A vehicle 100 is shown in FIG. 2A in a first, nominal position 200 and shown in FIG. 2B in a second, kneeling position 250. For example, while vehicle 100 is driving, the skateboard chassis 108 may be held in the position shown in FIG. 2A by the front suspension 126 and the rear suspension 156. As shown, the vehicle floor 211 may be raised above the ground by a height 220 in the nominal position 200. For brevity, the floor 132 of the vehicle cabin 134 may be configured to be raised/lowered as a single unit with the vehicle floor 211 with respect to the description herein. However, it will be appreciated that other examples may include adjustment of a height of the cabin floor 132 above the ground independent of the vehicle floor 211, e.g., the cabin floor 132 and the vehicle floor 211 do not move in unison.

Next, FIG. 2B shows vehicle 100 in the kneeling position 250, in which the vehicle floor 211 is lowered relative to the nominal position 200. For example, as shown, the vehicle floor 211 is raised above the ground by a height 221, which may be less than the height 220. In some examples, vehicle 100 may be configured to have one default kneeling position, such as the kneeling position 250 of FIG. 2B. In other examples, vehicle 100 may be configured to have a plurality of kneeling positions, including positions with heights in between the height 220 of the vehicle floor 211 of FIG. 2A and the height 221 of the vehicle floor 211 of FIG. 2B, and positions with heights lower than the kneeling position 250 of FIG. 2B. In yet another example, the kneeling position 250 of FIG. 2B may be a maximum lowered position of the vehicle 100, e.g., the vehicle floor 211 may not be lowered any further. For example, the controller 150 may command lowering of the vehicle 100 to a kneeling position based on operating conditions (e.g., such as one or more of a user input, a camera feed, a voice command, a proximity sensor, a key fob signal, a motion sensor, etc.), and may determine a desired kneeling position based on operating conditions. The controller may lower the vehicle to a kneeling position according to the method of FIG. 4, in some examples. In some examples, when requested by the driver, the controller may raise the vehicle, e.g., above the height 220 of the first, nominal position 200, in order to enable driving in snow or on incline planes where additional ground clearance is preferred.

Overall, the front suspension system 126 and the rear suspension system 156 may be configured so that the skateboard chassis 108 may be raised and lowered relative to the ground by adjusting one or more air springs. Stated differently, the front suspension system 126 and the rear suspension system 156 may be collectively operated as an adjustable suspension system, so that the height of the skateboard chassis 108 relative to the ground may be adjusted by adjusting one or more air springs of the adjustable suspension system (e.g., the front suspension system 126 and the rear suspension system 156). For example, by adjusting the inflation/deflation of the air spring 130 of each of the front suspension system 126 and the rear suspension system 156, the vehicle may be transitioned from the nominal position 200 shown in FIG. 2A to a kneeling position, such as the kneeling position 250 shown in FIG. 2B. In some examples, the controller may select between more than one kneeling positions for the adjustable suspension system, while in other examples, the vehicle may have only one kneeling position. Lowering the skateboard chassis 108 to the kneeling position may facilitate unloading of the vehicle, and may increase ease of use by the user, leading to an increase in user satisfaction. Further, user safety and/or energy may be preserved by decreasing an incidence of muscle strain and fatigue due to lifting heavy items from a high floor. Further still, lowering the vehicle may ameliorate challenges presented by entering and exiting the vehicle cabin, as the vehicle cabin may be lowered closer to the ground in the kneeling position. Thus, using the adjustable suspension system (e.g., comprising the front suspension system 126 and the rear suspension system 156), the skateboard chassis 108 may be raised and lowered, such as by adjusting an amount of air in the air springs. In some examples, the vehicle may move at a low speed while the skateboard chassis 108 is raised in order to increase ground clearance.

Entering and exiting the vehicle may be further eased by configuring the vehicle with a hands-free, automated door system. The automated door system enables one or more of unlocking and opening doors of the vehicle based upon sensor input in addition to manually actuated input mechanisms and devices for unlocking/locking the doors, such as buttons at the doors, a dashboard, or a key fob, a key inserted into a key slot, etc. In other words, the automated door system includes manual actuation mechanisms, e.g., mechanisms demanding hands-on engagement, as well as sensor-based door actuation, e.g., hands-free mechanisms. The sensor input enables monitoring of a position of the user relative to vehicle which allows actuation of the vehicle door motors based on the user's positioning. In one example, the automated door system includes a first sub-system and a second sub-system. The first sub-system of the automated door system may provide signals and commands according to a position of the user external to the vehicle. For example, the first sub-system may rely RFID to activate unlocking and opening of the vehicle doors in response to the location of the user outside of the vehicle. The second sub-system may provide signals and commands based on detection of the user within the vehicle via photoelectric sensors in a through-beam configuration. Each sub-system may utilize information received from sensors and motors coupled to the vehicle doors, as shown in FIG. 3.

The vehicle 100 of FIGS. 1-2B is depicted in FIG. 3 from a cross-sectional view 300, e.g., a cross-section taken along line A-A' of FIG. 2B, across the x-z plane. The cross-sectional view 300 shows an interior of the vehicle, including an interior of the vehicle cabin 134 and an interior of the storage compartment 212. The interior of the vehicle cabin 134 includes a driver's seat 302 and a passenger seat 304. The vehicle cabin 134 may be accessible to a driver/passenger by first door 306 and a second door 308 arranged at an opposite side of the vehicle cabin 134 from the first door 306. As an example, the first door 306 may be a driver side door 306 and the second door 308 may be a passenger side door 308.

The storage compartment 212 may include a third door 310 at the rear end 116 of the vehicle 100. The third door 310 may be a rear door 310 providing access to the storage compartment 212 from the rear end 116 of the vehicle. The rear door 310 may provide a large opening at the rear end 116, e.g., the rear door 310 may be larger than the driver side door 306 or the passenger side door 308, to enable loading and unloading of objects of various sizes to and from the storage compartment 212. In some examples, the rear door 310 may be a roll-up door, configured to be raised and lowered vertically, e.g., along the y-axis. In other examples, the rear door 310 may be one hinged door, configured to swing open at the hinge, or two hinged doors configured to each swing open at respective hinges along a side of each hinged door. It will be appreciated that various types of doors may be implemented at the rear end 116 of the vehicle without departing from the scope of the present disclosure.

The vehicle 100 may further include a fourth door 312 arranged in a partition 314 separating the vehicle cabin 134 from the storage compartment 212 of the vehicle 100. The partition 314 may be a bulkhead partition providing a physical barrier between the vehicle cabin 134 and objects stored in the storage compartment 212. In some examples, the partition 314 may also provide an insulating barrier between the vehicle cabin 134 and the storage compartment 212 such that adjustments to an environment to the vehicle cabin 134, e.g., heating and cooling, does not extend to the storage compartment 212 which may otherwise reduce an energy efficiency of the vehicle 100. The fourth door 312, hereafter a bulkhead door 312, may provide an opening for an occupant of the vehicle cabin 134, e.g., the driver or passenger, to move between the vehicle cabin 134 and the storage compartment 212 without exiting the vehicle 100.

One or more of the driver side door 306, the rear door 310 and the bulkhead door 312 may each be adapted with a motor 316 which is included in a door control unit (DCU) 350 of each vehicle door. In some examples, the motor 316 may also be coupled to the passenger side door 308 (not shown in FIG. 3). The motor 316 may control movement of the door to which it is coupled. For example, the motor 316, when electrically energized by an energy storage device such as the battery pack 102 of FIGS. 1-2B, adjust the driver side door 306 from a closed position to an open position, as shown in FIG. 3. Similarly, the motor 316 may cause the rear door 310 to roll up, when the rear door 310 is configured as the roll-up door, and adjust the bulkhead door 312 from a closed position to an open position as shown in FIG. 3. In some examples, the motor 316 may also be configured to close the door to which it is coupled, when the door is in the open position. Operation of the motor 316, e.g., activation/deactivation, may be controlled by the VCU of the vehicle 100, e.g., the VCU included in the controller 150 of FIG. 1, as described further below with reference to FIGS. 6A-9G.

The DCU 350 of each external door, e.g., the driver side door 306 and the rear door 310, may also include a first door sensor 318 coupled to exterior doors of the vehicle 100. The first door sensor 318 may be used in the first sub-system of the hands-free, automated door system to actuate unlocking/locking and opening/closing of the exterior door when a user, e.g., the driver, is positioned outside of the vehicle. In one example, the first sub-system may rely on RFID communication between a RFID reader 360 and one or more RFID tags, where the RFID reader 360 may be embedded in a key fob. The first door sensor 318 may include a RFID tag providing information regarding a distance and a location of the RFID reader 360 relative to the RFID tag. The RFID reader 360 may communicate wirelessly with the VCU of the vehicle.

For example, when the RFID reader 360, which may be held or carried by the user, is positioned proximate to the driver side door 306, external to the vehicle, the first door sensor 318 of the driver side door 306 is within a signal range of the RFID reader 360 while the first door sensor 318 of the rear door 310 is beyond the signal range of the RFID reader 360. The RFID reader may determine that the user is positioned along a driver side of the vehicle 100, proximate to the driver side door 306, and notify the VCU of the position of the user. In response, the VCU, when in an active mode, may determine a position, e.g., open or closed, of the driver side door 306 and a status, e.g., locked or unlocked, of the driver side door 306, and command adjustments accordingly.

In one example, the RFID reader 360 may be disposed in a key fob used to remotely control a state of the vehicle, e.g., a mode of the VCU, as well as locking/unlocking of the vehicle doors. A position of the RFID reader 360 relative to the vehicle, and thus of the user when carried by the user, may be monitored by the VCU when the user is outside of the vehicle. By providing information regarding a location of the user relative to the exterior doors of the vehicle 100, the first sub-system of the automated door system may enable unlocking/locking and opening/closing of the exterior doors according to an anticipated door usage and the state of the vehicle. The first sub-system may allow the user to enter the vehicle cabin 134 and access the storage compartment 212 from the rear end 116 of the vehicle without manually manipulating the door or manually inserting a key or pressing a key fob button to actuate locking/unlocking of the door.

The DCU 350 of each of the vehicle doors, e.g., the driver side door 306, the rear door 310, and the bulkhead door 312, may also include a second door sensor 320 which may be used in the second sub-system of the automated door system. In some examples, the second door sensor 320 may also be coupled to the passenger side door 308. The second door sensor 320 may be positioned along an interior surface (e.g., facing into the vehicle cabin 134) of the driver side door 306 and an interior surface (e.g., facing into the storage compartment 212) of the rear door 310. While the second door sensor 320 is shown coupled to a surface of the bulkhead door 312 that is facing the storage compartment 212, other examples may include the second door sensor 320 being placed on an opposite surface of the bulkhead door 312 or arranged on both surfaces of the bulkhead door 312.

The second door sensor 320 may be a photoelectric sensor, including a transmitter and a receiver, communicatively linked to the VCU. In some examples, more than one photoelectric sensor may be coupled to each door. In one example, the transmitter may be coupled to the door and the receiver may be coupled to the frame of the door. However, in other examples, the transmitter may instead be coupled to the frame of the door and the receiver placed on the door. In yet other examples, the transmitter and receiver may be arranged at one of the vehicle doors and a different region of the vehicle interior. For example, the transmitter may be on storage compartment-facing surface of the bulkhead door 312 and the receiver may be on an interior wall of the storage compartment 212. The transmitter may emit a signal light beam (visible or infrared light) which is received by the receiver. The signal light beam may be interrupted when an object, such as the user, is positioned between the transmitter and receiver. As such, interruption of the signal light beam at second door sensor 320 of any of the doors may allow detection of user movement within the vehicle.

For example, when the user is the driver and the user leaves the driver's seat 302 and enters the storage compartment 212, the location of the user may be detected as the user passes through the signal light beam of the second door sensor 320 arranged at the bulkhead door 312. The location of the user is relayed to the VCU. When the vehicle is in a suitable operating mode, the VCU may determine when the user is approaching one of the exterior doors of the vehicle 100 and command unlocking of the door and opening of the door. Thus, the user may exit the vehicle 100 while carrying a load without demanding manual manipulation of the door or manual depression of a button on the key fob.

Furthermore, the automated door system may be fully available (e.g., activated using manual mechanisms as well as the first and second sub-systems) only when the vehicle is stationary and adjusting a height of the vehicle floor, as described above with reference to FIGS. 2A-2B. As an example, the automated door system may be unavailable while the vehicle floor is transitioning from one height to another. However, if a change in the vehicle floor height is requested during operation of the automated door system, the change in vehicle floor height may be executed while maintaining the automated door system availability.

The automated door system may further include dashboard control buttons in addition to the first and second sub-systems to provide instructions to the VCU and adjust operating modes of the automated door system. For example, as shown in FIG. 4, a human machine interface (HMI) may include a display screen 400 at a dashboard of the vehicle, which may, in one example be a touch screen. The display screen 400 allows the user to navigate to the automated door system control screen where control buttons may be displayed. For example, a first on/off button 402 may be provided for selection of automated door closing at the bulkhead door. A second on/off button 404 may be provided for enabling/disabling of automated door closing at the driver side door. The display screen 400 may also include a third on/off button 406 for selecting door opening to be activated by key fob button depression only and a fourth on/off button 408 for selecting an availability of the motors controlling opening/closing of the doors. It will be appreciated that the selectable options shown in FIG. 4 are non-limiting examples and a variety of selectable options may be shown in addition or in place of the options shown.

Activation of the automated door system may be dependent on a state of the VCU and the vehicle. For example, when the vehicle is in a first state, where the doors are locked, the motor is off, and dashboard control buttons of the automated door system (as described above with reference to FIG. 4), as well as buttons of the key fob to unlock doors and start the motor, are disabled, the automated door system may be deactivated and unavailable if the VCU is in a shutdown mode. Only the first sub-system of the automated door system may be in a detection mode, e.g., listening, until the VCU is adjusted to a stand-by mode or an active mode, e.g., woken up, by unlocking the vehicle with the key fob, inserting a key in a key slot, or turning on the ignition with the key. Alternatively, the vehicle may be in the first state with the VCU in the stand-by mode, and the automated door system may not be active until the vehicle is unlocked with the key fob, and/or the vehicle is started with the key, e.g., with the key inserted into the key slot. In addition, the key may be removed from the key slot and the VCU may be adjusted to the shutdown mode, thereby rendering the automated door system unavailable. As another example, the vehicle may be in the first state and the vehicle battery is recharging. The VCU may be active but busy and the automated door system may not be usable until the vehicle is unplugged. The manual input mechanisms, the first sub-system, and the second sub-system may be unavailable while the vehicle is in the first state.

The vehicle may be in a second state when the vehicle motor is started and the doors are locked. In the second state, the automated door system may be at least partially available. For example, the first and second sub-systems may not be available but automatic door actuation may be enabled by the manual input mechanisms (e.g., push buttons coupled to exterior sides of the doors, dashboard buttons, key fob buttons, etc.). A high voltage battery pack of the vehicle may be actively providing electrical energy, allowing the manual input mechanisms of the automated door system to be at least partially available. If the VCU is on and busy (e.g., the motor is operating) and the vehicle is in a parked mode, full activation, e.g., both the first and second sub-systems operating, of the automated door system may not be allowed until the vehicle is adjusted out of the parking mode, e.g., adjusted to a drive or reverse mode, or the vehicle motor is shutdown. Adjustment of the vehicle between the parked, drive, and reverse modes may be enabled via dashboard buttons. When the vehicle is in the second state and in the drive or reverse mode with the VCU on, partial activation of the automated door system may be allowed when the vehicle motor is shutdown using the key or pressing a dashboard button.

Additionally, the vehicle may be in a third state when the doors of the vehicle are unlocked and the motor is started. The automated door system is available, e.g., the dashboard control buttons, the first sub-system and the second sub-system are all operational when the vehicle is in the third state and the VCU is in the stand-by mode or on, e.g., awake. The VCU may be adjusted to an awake mode from the stand-by mode when the user is detected to approach or leave the vehicle via the first sub-system. Hands free opening and closing of the vehicles doors is enabled. A summary of the first, second, and third states is provided below in Table 1.

TABLE 1

Summary of automated door system availability according to vehicle state

| Vehicle state | Vehicle status | State characteristics | Allowed actions | Commanding controller |
|---|---|---|---|---|
| 1 | Vehicle locked: | Automated door system not available | | |
| | With VCU shutdown | System in sleep mode, only RFID system listening | Unlock w/key fob | DCU |
| | | | Wake up w/key | VCU |
| | | | Start vehicle w/key | VCU |
| | With VCU on stand-by | System can only start w/key or key fob | Unlock vehicle w/key fob | VCU |
| | | | Start vehicle w/key | VCU |
| | | | Remove key (shutdown VCU) | VCU |
| | Charging | VCU is on and busy | Unplug vehicle | VCU |
| 2 | Vehicle locked and w/motor started: | High V batteries on-Automated door system partially available (push buttons, dashboard buttons) | | |
| | VCU on and busy (motor started)- Parking mode | High voltage batteries on, vehicle cannot move | Drive/Reverse button pressed | VCU |
| | | | Shutdown motor w/key (not VCU) | VCU |
| | | | Shutdown motor and VCU w/key | VCU |
| | | | Shutdown motor w/dashboard button | VCU |
| | VCU on and busy (motor started)- Drive/reverse mode | High voltage batteries on, vehicle can move | Park button pressed | VCU |
| | | | Shutdown motor w/key (not VCU) | VCU |
| | | | Shutdown motor and VCU w/key | VCU |
| | | | Shutdown motor w/dashboard button | VCU |
| 3 | Vehicle unlocked and w/motor started: | Automated door system fully available | | |
| | With VCU off | Impossible, VCU must be at least in stand-by mode when vehicle unlocked | | |
| | With VCU in stand-by | System awake, driver is approaching/ leaving vehicle | Push dashboard start button | VCU |
| | | | Sensors detect driver leaving | VCU |
| | | | Push keyfob lock button | VCU |
| | | | Opening/closing doors commanded | VCU |

VCU states:
VCU shutdown = low and high voltage electrical circuits disabled
VCU stand-by = low voltage circuit available, vehicle cannot move
VCU on = low and high voltage circuits available
Charging = VCU on and busy, vehicle cannot move When used in combination with adjustment of the vehicle floor height, e.g., kneeling, use of the automated door system may be modified based on certain conditions, such as the height of the vehicle floor and a relative proximity of the user Additionally, activation of the floor height adjustment may be differentiated from activation of the automated door system when initiated using similar techniques. For example, when using gestures, such as hand-waving, to activate each of the floor height adjustment and the first and/or second sub-systems of the automated door system, the floor height adjustment may be controlled by one set/number/combination of gestures and the automated door system by a different set/number/combination of gestures. As an example, the floor height may be modified by a single hand wave and the automated door system may be activated by two hand waves.

When the vehicle floor adjustment is halted and held at a kneeling position, the automated door system may be fully available, e.g., both the manual mechanisms and the hands-free sub-systems are operational, as shown above in Table 3 with reference to the third state. When the vehicle floor is adjusted to a raised position relative to the kneeling position, e.g., at a nominal height or higher than the nominal height, and held at the raised position, a height of the vehicle doors is increased relative to a height of the user. As such, a likelihood of the doors contacting the user's upper body and/or face is increased when the doors are opened when the doors are configured to swing open from a hinge.

To mitigate undesirable contact between the user and the doors, door opening may be modified to account for user comfort and safety. As an example, when the floor height is confirmed to be above a height corresponding to the kneeling position, the first and second sub-systems may be used to determine a location of the user relative to the door to be actuated. If the user is within a threshold distance of a driver's side door, e.g., within a radius of an arc of the driver's side door when the door is swung open, the driver's side door may be opened at a reduced speed relative to when the door is opened while the vehicle is kneeling. Alternatively, the driver's side door may be unlocked but not opened if the user is within the threshold distance. In some examples, a notification or alert may be provided to the user, e.g., the key fob may emit a sound, when door opening is requested but the user is within the threshold distance, to indicated to the user to move away from the door. Once the user moves outside of the threshold distance, the door may be opened.

As such, operation of the automated door system may demand additional confirmations prior to actuation of the vehicle doors, as described above. The additional confirmations may be embedded into methods for operating the automated door system, as described below with reference to FIGS. 6A-9G but discussion of the additional confirmation is omitted for brevity. For example, determination of the user's position relative to the doors is implied prior to opening any of the vehicle doors and opening of the doors may be suspended until the user is confirmed to be at a location where the doors do not contact the user and/or open at reduced speed.

In this way, the combination of the first sub-system and the second sub-system of the automated door system enables hands-free entry/exit and loading/unloading of the vehicle 100. Furthermore, the automated door system may be implemented in conjunction with raising and lowering of the vehicle floor as described above with reference to FIGS. 2A-2B and below with reference to FIG. 5. An ease of vehicle access may be increased for the user while allowing for user-controlled activation of doors and vehicle floor height.

FIG. 5 shows a flowchart of an example method 500 for raising and lowering (e.g., kneeling) a vehicle with a skateboard frame (e.g., such as vehicle 100 shown in FIGS. 1-3) via an adjustable suspension system (e.g., such as front suspension system 126 and rear suspension system 156 of FIG. 1). Method 500 will be described with respect to the vehicle configuration shown in FIGS. 1-3 and the suspension system shown in FIG. 1, although method 500 may be applied in other systems that include a skateboard frame chassis and an adjustable suspension system. Instructions for carrying out method 500 may be executed by a controller, such as controller 150 of FIG. 1, based on instructions stored on a memory of the controller and in conjunction with signals received from sensors of the vehicle system, such as the sensors described with reference to FIG. 1. The controller may employ actuators of the vehicle system to adjust vehicle operation according to the methods described below, such as by adjusting the adjustable suspension system in order to lower and raise the skateboard chassis of the vehicle.

At 502, method 500 includes estimating and/or measuring vehicle operating conditions. The operating conditions may include, for example, vehicle speed, engine status (e.g., whether the engine is on), whether the vehicle is parked, and whether a user is in the vehicle. The operating conditions may further include one or more of a proximity of a user and a proximity of a key fob. The operating conditions may be measured by one or more sensors communicatively coupled to the controller, or may be inferred based on available data.

At 504, method 500 includes determining whether a kneeling position is requested. In particular, the method includes determining whether to lower the vehicle floor to a kneeling position in order to accommodate a user while the vehicle is stopped, e.g., stationary. A request to lower the vehicle to a kneeling position may be possible when the vehicle is stopped. For example, when the vehicle is moving (e.g., not stopped or parked), the kneeling position may not be requested. When the vehicle is stopped (e.g., the engine is off and/or the vehicle is parked), the kneeling position may be requested based on one or more sensor inputs indicative of a request for the kneeling position. Specifically, the vehicle may be lowered when the controller determines that a user will be exiting the vehicle and/or unloading objects, which may be facilitated by the kneeling position. As another example, the vehicle may be lowered when the controller determines that a user will be re-entering the vehicle. For example, the sensor inputs may include a user input, such as one of a voice command, a button press, and a gesture. As another example, the sensor inputs may include a proximity and/or motion sensor (e.g., such as proximity and motion sensor 180 of FIG. 1), a GPS signal, a signal from a key fob, a camera feed, and the like.

In some examples the vehicle may be lowered and raised based on one input, or a combination of inputs. For example, a user may provide an input corresponding with a request to lower the vehicle to the kneeling position. As a first example, the user may directly control the height of the skateboard chassis via an input device, such as a button in the vehicle cabin, a button on a key fob, a voice command, a gesture, and an input to an application on a mobile device. For example, the user input may be a user input, such as one of a voice command and a gesture. As an example, the vehicle includes a motion sensor, and the user input is a gesture (e.g., such as moving a hand or a foot) near the motion sensor. Further, in some examples, the controller may automatically command raising and/or lowering the skateboard chassis based on one or more sensor inputs, such as a proximity sensor monitoring a position of the user (e.g., an RFID system, as described further below), a motion sensor detecting a user gesture, a key fob proximity to the vehicle, a camera feed from one or more cameras mounted to the vehicle, and the like. As an example, the controller may rely on a combination of inputs. For example, if the controller determines that the key fob is within a pre-determined distance of the vehicle, and the motion sensor detects movement, the vehicle may lower into the kneeling position. Further, the controller may apply machine learning techniques in order to predict a desired vehicle height across a range of operating conditions. For example, the controller may apply machine learning techniques to determine a first set of geographic locations where a user may request the vehicle to lower into a kneeling position upon stopping the vehicle, and a second set of geographic locations where the user may not request the vehicle to lower into a kneeling position upon stopping the vehicle. As another example, the controller may analyze a camera feed from one or more cameras mounted to the vehicle, and may determine when to raise and lower the vehicle based on the camera feed. In some examples, the vehicle may kneel before the user exits the vehicle. For example, the vehicle may kneel in order to lower the skateboard chassis before the user exits, which may increase user safety while exiting the vehicle. In other examples, the vehicle may kneel when the user determines to unload the vehicle. For example, the user may exit the vehicle, and the vehicle may then kneel for unloading.

If the kneeling position is not requested at 504, method 500 continues to 506, and includes not lowering the vehicle to a kneeling position. For example, the controller may not adjust the adjustable suspension system in order to lower the skateboard chassis to a kneeling position, and may instead maintain the vehicle in the nominal position. Method 500 may then end.

If the kneeling position is requested at 504, method 500 continues to 508 to determine a desired kneeling position. For example, as elaborated above with respect to FIGS. 2A-2B, the vehicle may be configured to have more than one kneeling position. As an example, a first kneeling position may be selected when the user is preparing to exit the vehicle, and a second kneeling position may be selected when the user is preparing to unload the vehicle. As another example, a user may input a command including which of the two kneeling positions to select. In another example, the adjustable suspension system may be configured only for one kneeling position. In yet another example, the controller may select a kneeling height for the vehicle based on machine learning techniques.

At 510, method 500 includes adjusting the suspension system of the vehicle to lower the vehicle floor to the desired kneeling position (e.g., the desired kneeling position determined at 508). For example, the controller may adjust an amount of air in one or more air springs of the adjustable suspension system in order to adjust the height of the skateboard chassis relative to the ground. In particular, an amount compression and/or deflation in each of a front suspension system and a rear suspension system (e.g., such as front suspension system 126 and rear suspension system 156 of FIG. 1) may be increased so that the skateboard chassis is lowered.

At 512, method 500 includes determining whether the nominal position is requested. For example, the controller may determine whether returning the vehicle floor to the nominal height (e.g., leaving the kneeling position) is requested. As one example, the vehicle may be raised when the controller determines that vehicle operation may resume (e.g., the user may begin driving the vehicle). For example, based on a sensed key fob proximity, the controller may command raising the vehicle to the nominal position. As another example, the controller may command raising the vehicle to the nominal position based on an input from the user, such as a user input to an input device in the vehicle cabin. In other examples, the controller may command returning the vehicle floor to the nominal height based on one or more of a voice command, a gesture, a key fob proximity, and sensing a vehicle key in an ignition. As an example, after the user finishes unloading objects from the vehicle, the user may provide a hands-free input (e.g., such as one of the voice command, the gesture, and the key fob proximity), in order to signal that the nominal position is requested.

If the nominal position is not requested at 512, method 500 continues to 514 to maintain the vehicle in the desired kneeling position. For example, the controller may continue to maintain the adjustable suspension system in the desired kneeling position in order to facilitate user activities, such as unloading the vehicle. Method 500 proceeds to return to 512.

If the nominal position is requested at 512, method 500 continues to 516 to adjust the suspension system to raise the vehicle to the nominal position. For example, controller may adjust the adjustable suspension system to raise the skateboard chassis to the nominal position. As an example, the controller may adjust an amount of air in one or more air springs of the adjustable suspension system, which may raise the skateboard chassis relative to the ground. For example, the nominal position may be configured so that the skateboard chassis is high enough off the ground for driving and other vehicle operation. Method 500 ends.

FIGS. 6A-6G show a method 600 for activating and operating a hands-free (e.g., obviating manual manipulation of doors and door locks) automated door system of a vehicle based on a state of the vehicle. The vehicle may be in a first, second, or third state as described above. An availability of the automated door system may be dependent on a status of the vehicle with respect to adjustment of a skateboard chassis and vehicle floor height as described above with reference to FIG. 5. During execution of method 600, as well as methods shown hereafter, the methods for operating the automated door system may be halted if adjustment to the vehicle floor height is requested and suspended until the adjustment is complete. As such, method 500 of FIG. 5 may be performed in conjunction to the following methods for operating the automated door system. The automated door system includes a first sub-system, relying on RFID sensors to detect a location of a user outside of the vehicle and a second sub-system, relying on photoelectric sensors, to detect a location of the user inside of the vehicle. The vehicle may be the vehicle 100 of FIGS. 1-3, having a motorized driver side door, bulkhead door, and rear door, as well as a display screen with dashboard control buttons, as shown in FIG. 4. A key fob may be used to activate various vehicle modes and operations and may include an RFID reader, such as the RFID reader 360 of FIG. 3. The vehicle may also include push buttons adjacent to each vehicle door to control locking/unlocking of the door and various lockers and switches to adjust electrical circuits of the doors and door locks. Method 600, as well as methods shown hereafter, will be described with respect to the vehicle configuration shown in FIGS. 1-3 and the suspension system shown in FIG. 1, although the methods may be applied in other systems that include a skateboard frame chassis and an adjustable suspension system. Instructions for carrying out method 600, and the other methods included herein, may be executed by a VCU included in a controller, such as controller 150 of FIG. 1, based on instructions stored on a memory of the controller and in conjunction with signals received from sensors of the vehicle system, such as the sensors described with reference to FIG. 1. The controller may employ actuators of the vehicle system to adjust vehicle operation according to the methods described below, such as by adjusting the adjustable suspension system in order to lower and raise a skateboard chassis of the vehicle.

At 602, method 600 includes estimating and/or measuring vehicle operating conditions. The operating conditions may include, for example, vehicle speed, engine status (e.g., whether the engine is on), whether the vehicle is parked, and whether a user is in the vehicle, as monitored by the VCU. The VCU may query a DCU of the controller to determine statuses of the vehicle doors (e.g., whether the doors are locked, open, etc.). The operating conditions may be measured by one or more sensors communicatively coupled to the controller, or may be inferred based on available data.

At 603, the method includes confirming if the vehicle floor height is being adjusted, e.g., transitioning between a kneeling position and a nominal position according to method 500 of FIG. 5. If the vehicle floor height is changing, the method returns to 602 to continue monitoring the vehicle operating conditions. If the vehicle floor height is not changing, the method continues to 604 to confirm if the vehicle doors are locked.

Confirming if the doors are locked (e.g., if one or more doors of the vehicle are locked) is determined based on data relayed from the DCU. If one or more of the doors are locked, the method continues to 606 to determine if the VCU is in a shutdown mode. For example, when the VCU is in the shutdown mode, the VCU may be inactive or sleeping and may remain as such until an action is performed to wake the VCU. If the VCU is in the shutdown mode, the automated door system is not available and method 600 continues to FIG. 6B where the vehicle is in the first state, described further below. If the VCU is not in the shutdown mode, the method proceeds to 608 to confirm if the VCU is in a standby mode. If the VCU is in the standby mode, the automated door system is not available and the method continues to FIG. 6C, described further below, where the vehicle is also in the first state. If the VCU is not in the standby mode, the vehicle is charging and the automated door system is not available. The method continues to FIG. 6D, described further below, where the vehicle is also in the first state.

Returning to 604, if the doors are not locked, the method proceeds to 610 to confirm if a vehicle motor is on. If the motor is on, the method continues to 612 to determine if the vehicle is in a parked mode. If the vehicle is in the parked mode, the automated door system is partially available and the method continues to FIG. 6E, described further below, where the vehicle is in the second state. If the vehicle is not in the parked mode, the vehicle may be in a drive or reverse mode and the automated door system is partially available. The method continues to FIG. 6F, described further below, where the vehicle is also in the second state.

Returning to 610, if the motor is not on, the automated door system is available and the method continues to FIG. 6G, described further below, where the vehicle is in the third state.

Figure 6A:
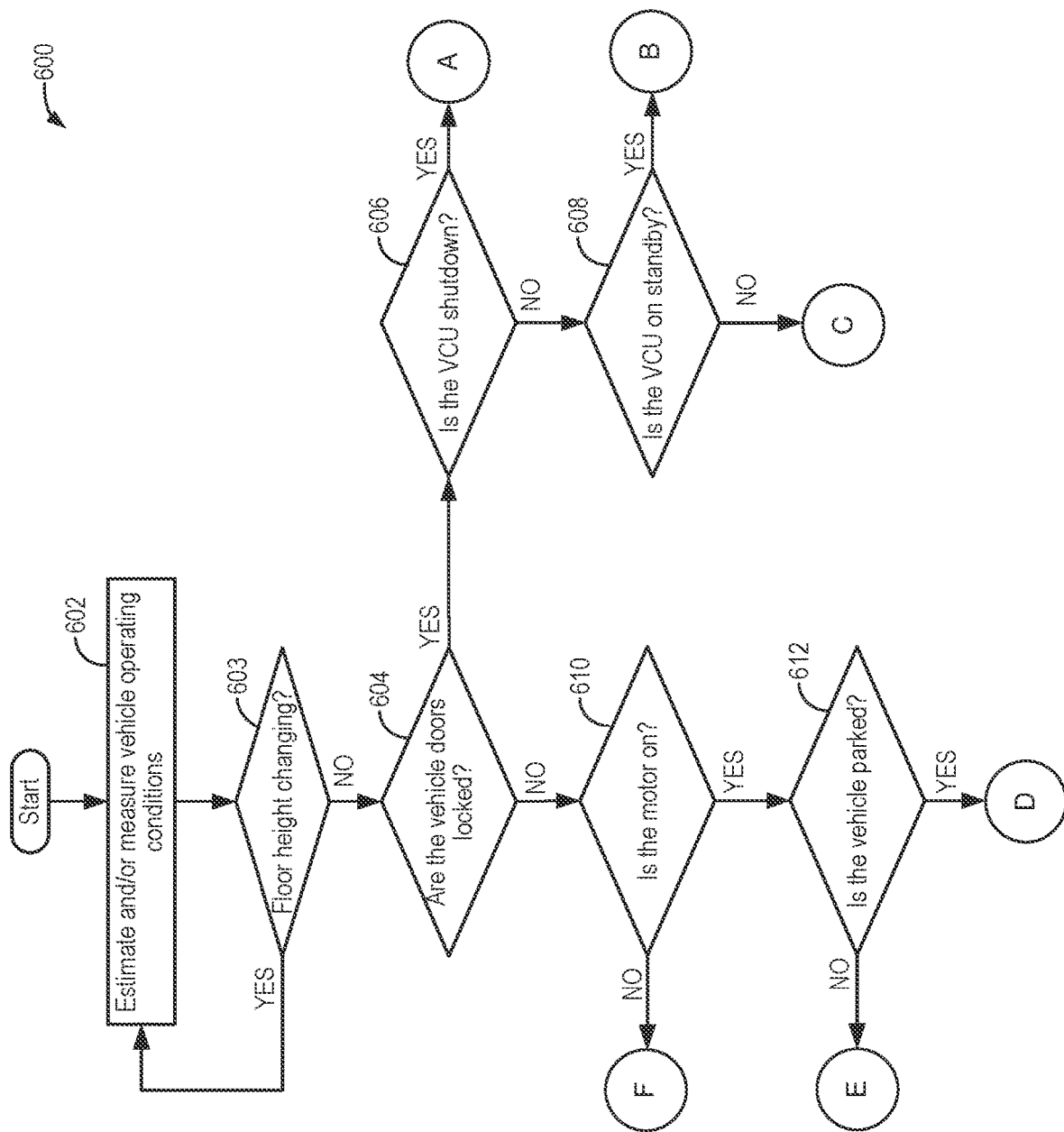
Figure 6B:
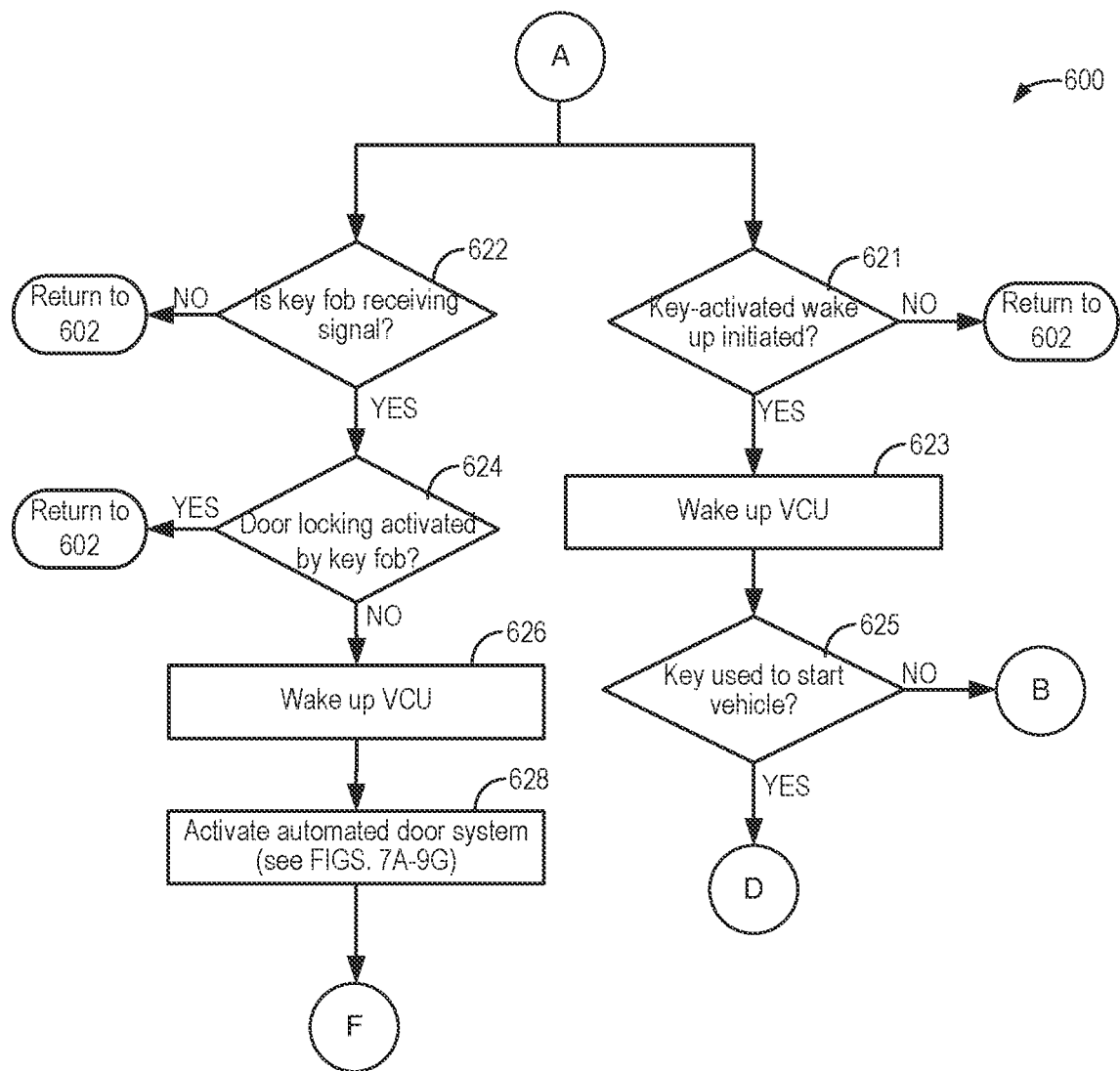

Turning now to FIG. 6B, the method may follow a first route, including determining if the key fob is receiving a signal, e.g., from the VCU, at 622. If the key fob is not receiving the signal, the method returns to 602 of FIG. 6A. If the key fob is receiving the signal, the method continues to 624 to determine if door locking is activated via the key fob. If door locking is activated, the method returns to 602 of FIG. 6A. If door locking is not activated, the method proceeds to 626 to wake up the VCU, adjusting the VCU to the standby mode. The automated door system is activated and available at 628. Activating the automated door system includes setting a mode of a photoelectric (PE) sensor at the bulkhead door to a cabin state, setting a mode of a PE sensor at the driver side door to a cabin state, and setting door push buttons to an active/on mode. Further details of activating the automated door system are provided below, with reference to FIGS. 7A-9G. The method then continues to FIG. 6G.

The method may also follow a second route, including determining if waking up of the VCU is activated by the key fob at 621. If waking up of the VCU is not commanded, the method returns to 602 of FIG. 6A. If waking up of the VCU is commanded, the method proceeds to 623 to wake up the VCU into the standby mode. At 625, the method includes confirming if the key fob is used to start the vehicle. If the key fob is not used to start the vehicle, the method continues to FIG. 6C. If the key fob is used to start the vehicle, the method continues to FIG. 6E.

Figure 6C:
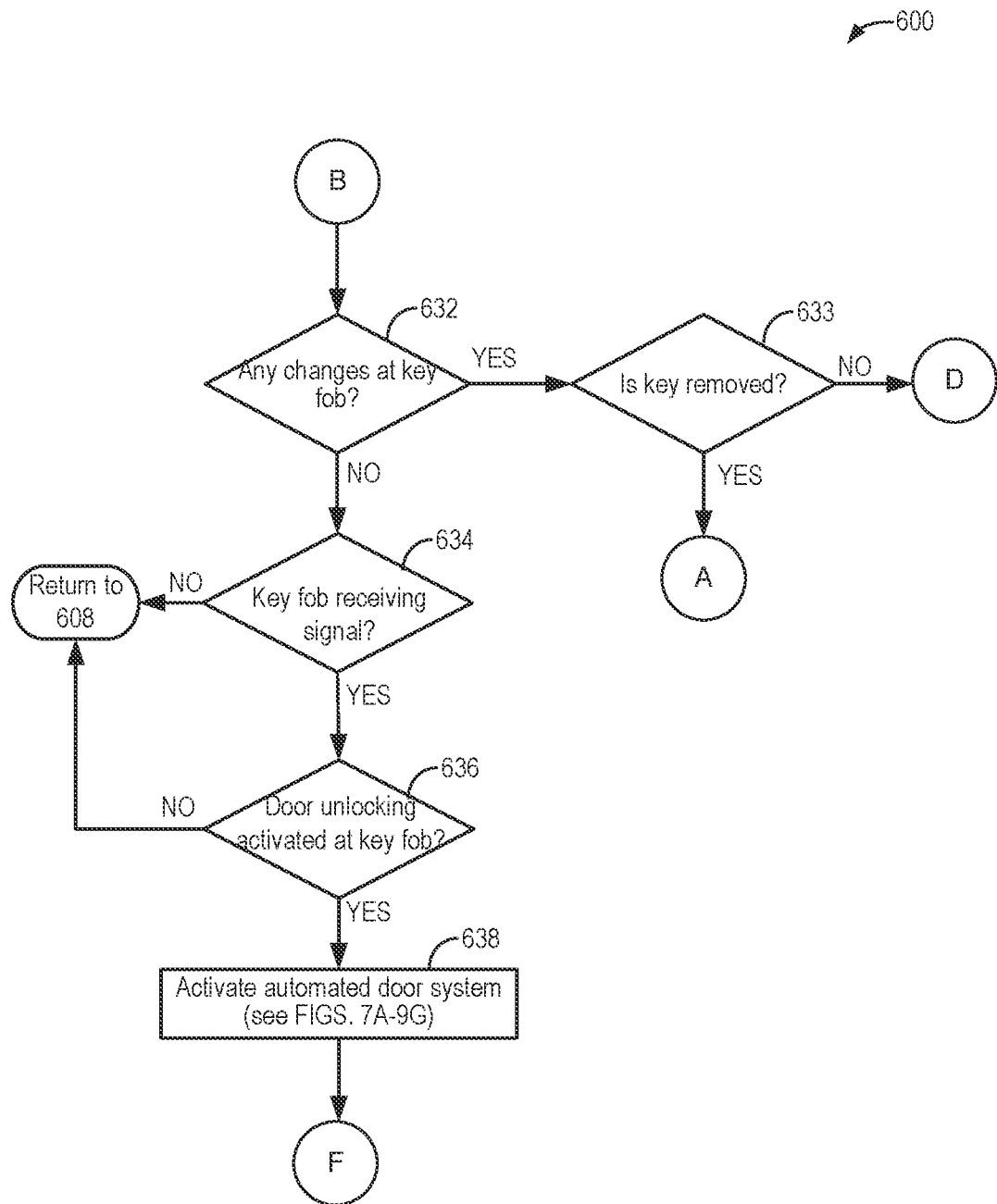

At 632 of FIG. 6C, method 600 includes determining if any changes are detected at the key fob. If a change is detected, the method continues to 633 to determine if the change is removal of the key fob, e.g., from a key slot for starting the vehicle. If the key fob is removed, the vehicle is off and the method continues to FIG. 6B. If the key fob is not removed, the method continues to FIG. 6E.

Returning to 632, if no changes are detected at the key fob, the method proceeds to 634 to determine if the key fob is receiving a signal. If the key fob is not receiving the signal, the method returns to 608 of FIG. 6A. If the key fob is receiving the signal, the method proceeds to 636 to confirm if door unlocking is activated at the key fob. If door unlocking is not activated, the method returns to 608 of FIG. 6A. If door unlocking is activated at the key fob, the method proceeds to 638 to activate the automated door system (as described below with reference to FIGS. 7A-9G). The method then continues to FIG. 6G.

Figure 6D:
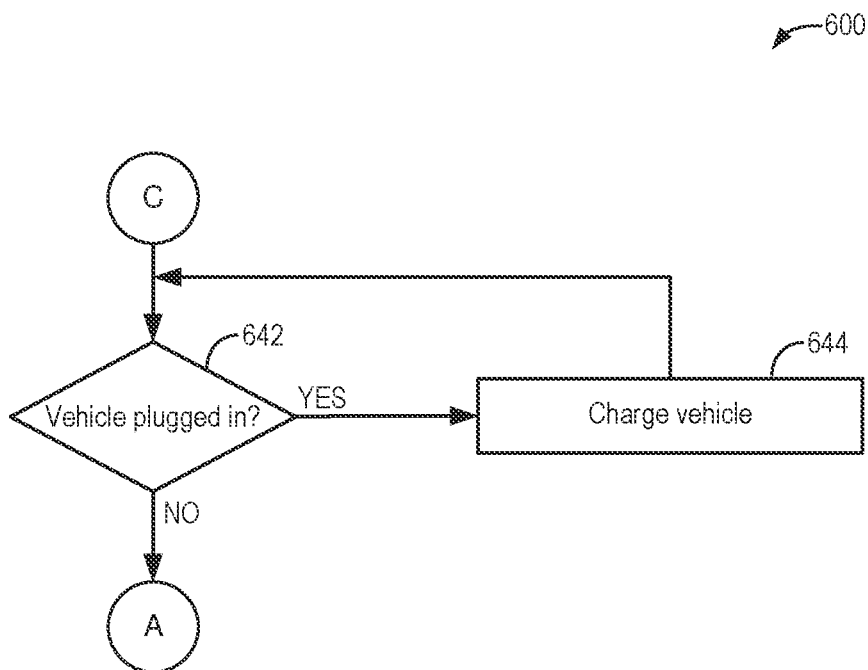

At 642 of FIG. 6D, the method 600 includes confirming if the vehicle is plugged in. If the vehicle is plugged in, the vehicle undergoes charging at 644. The method returns to 642. If the vehicle is not plugged in, the method proceeds to FIG. 6B.

Method 600 may undergo a first route at FIG. 6E, including confirming if the vehicle is plugged in at 652. If the vehicle is not plugged in, the method returns to 612 of FIG. 6A. If the vehicle is plugged, the method continues to 654 to deactivate the door push buttons as well as the PE sensors of the second sub-system. The method continues to FIG. 6F.

The method may follow a second route at FIG. 6E, including confirming if the start button is pressed at 656. If the start button is not pressed, the method returns to 612 of FIG. 6A. If the start button is pressed, the method continues to 658 to activate the automated door system. The method continues to FIG. 6G.

The method may also follow a third route at FIG. 6E, including determining if any changes are detected at the key fob at 653. If no changes are detected, the method returns to 612 of FIG. 6A. If changes are detected at the key fob, the method proceeds to 655 to confirm if the changes include adjusting the VCU to the standby mode. If the VCU is adjusted to the standby mode, the method proceeds to FIG. 6C. If the VCU is not adjusted to the standby mode, the method continues to FIG. 6B.

Figure 6F:
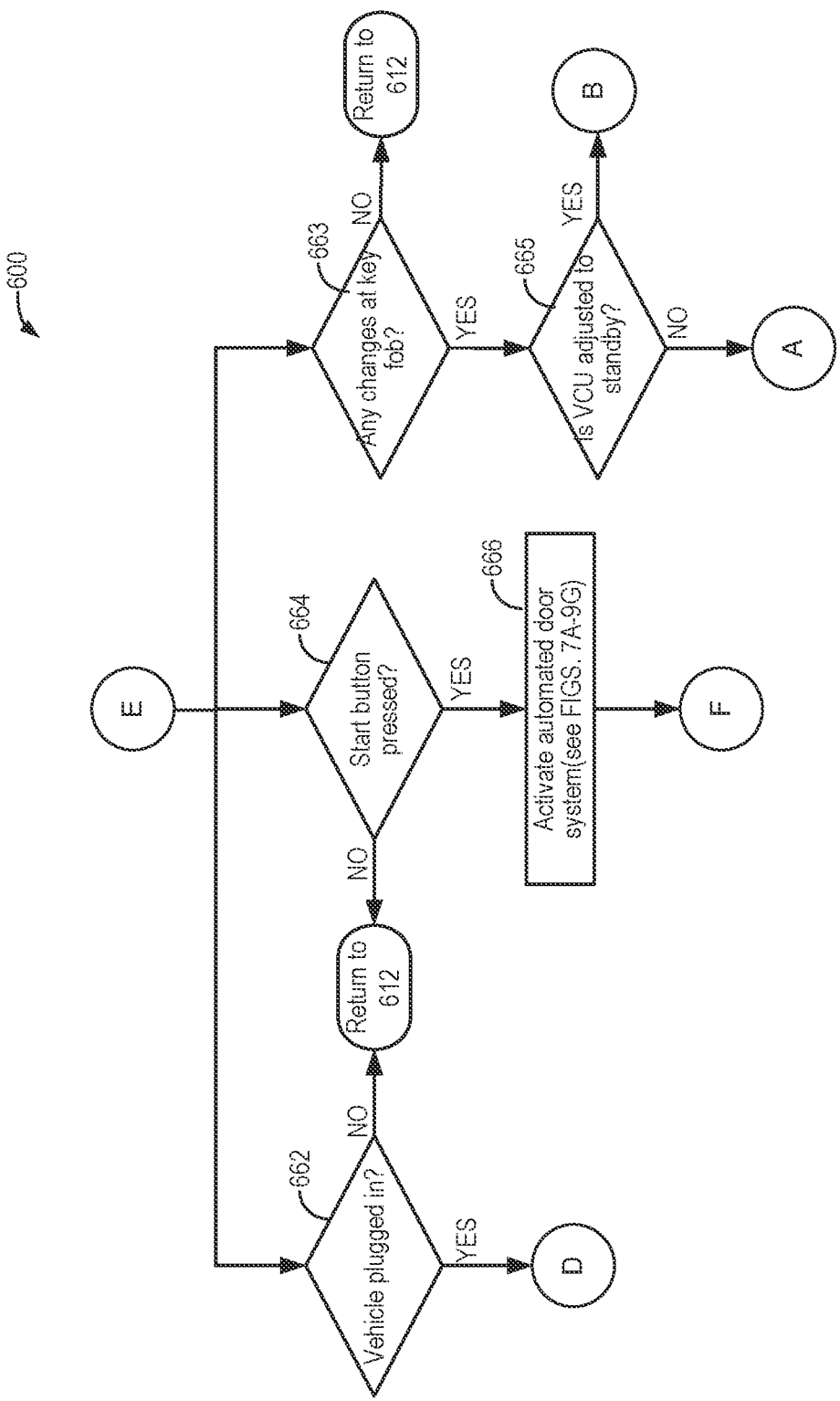

Method 600 may follow a first route at FIG. 6F, including determining if the vehicle is plugged in at 662. If the vehicle is not plugged in, the method returns to 612 of FIG. 6A. If the vehicle is plugged in, the method proceeds to FIG. 6E.

The method may also follow a second route at FIG. 6F, including confirming if the start button is pressed at 664. If the start button is not pressed, the method returns to 612 of FIG. 6A. IF the start button is pressed, the method continues to 666 to activate the automated door system. The method continues to FIG. 6G.

The method may further follow a third route at FIG. 6F, including determining if any changes are detected at the key fob at 663. If no changes are detected, the method returns to 612 of FIG. 6A. If changes are detected at the key fob, the method proceeds to 665 to confirm if the VCU is adjusted to the standby mode. If the VCU is adjusted to the standby mode, the method continues to FIG. 6C. If the VCU is not adjusted to the standby mode, the method proceeds to FIG. 6B.

Figure 6G:
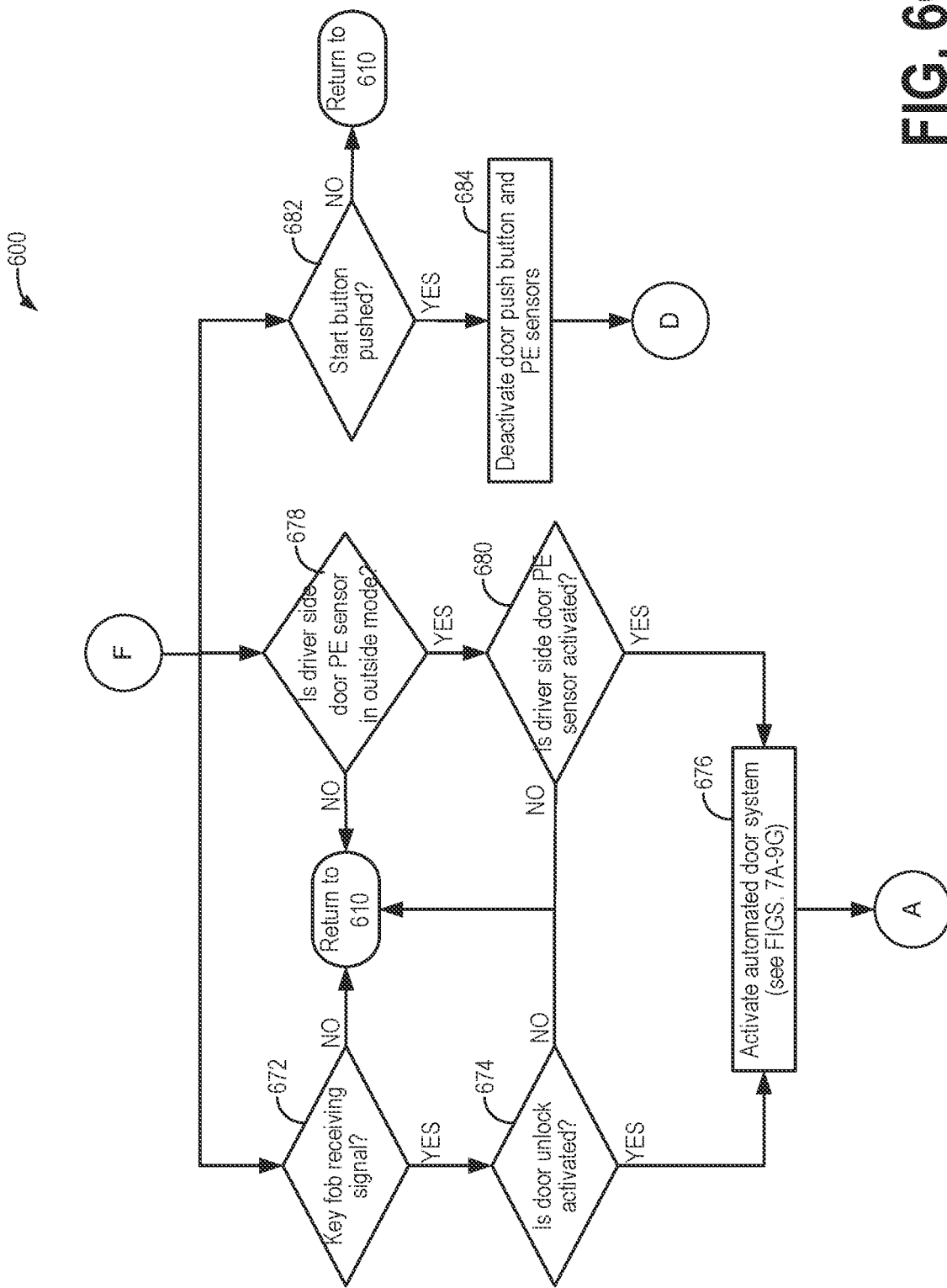

Method 600 may follow a first route at FIG. 6G, including confirming if the key fob is receiving a signal at 672. If the key fob is not receiving the signal, the method returns to 610 of FIG. 6A. If the key fob is receiving the signal, the method continues to 674 to determine if door unlocking is activated at the key fob. If door unlocking is not activated, the method returns to 610 of FIG. 6A. If door unlocking is activated, the method proceeds to 676 to activate the automated door system, as described below with reference to FIGS. 7A-9G. The system may be fully available, e.g., control via the first and second sub-systems, the dashboard control buttons, are operable. The method continues to FIG. 6B.

The method may also follow a second route at FIG. 6G, including confirming if the driver side door PE sensor is adjusted to an outside sensing mode at 678. If the PE sensor is not in the outside sensing mode, the method returns to 610 of FIG. 6A. If the PE sensor is in the outside sensing mode, the method continues to 680 to determine if the driver side door PE sensor is activated. If the PE sensor is not activated, the method returns to 610 of FIG. 6A. If the PE sensor is activated, the method proceeds to activate the automated door system at 676. The method continues to FIG. 6B.

The method may further follow a third route at FIG. 6G, including confirming if the start button is pressed at 682. If the start button is not pressed at 682, the method returns to 610 of FIG. 6A. If the start button is pressed, the method continues to 684 to deactivate the door push buttons and PE sensors. The method continues to FIG. 6E.

FIGS. 7A-9G show methods for operating the automated door system at each of the rear door, the bulkhead door, and the driver side door. The methods may be executed in conjunction with the vehicle states as shown in method 600 of FIGS. 6A-6G as well as method 500 of FIG. 5. For example, the automated door system may be activated under the conditions described with respect to method 600 and when the vehicle is in the third state and in a static position, e.g., at the nominal or kneeling positions, during which the vehicle cannot move. Furthermore, adjustment of the vehicle floor height may be activated based on detection of the user position, e.g., when the user is approaching an external door from outside of the vehicle, in combination with suitable vehicle states.

Figure 7A:
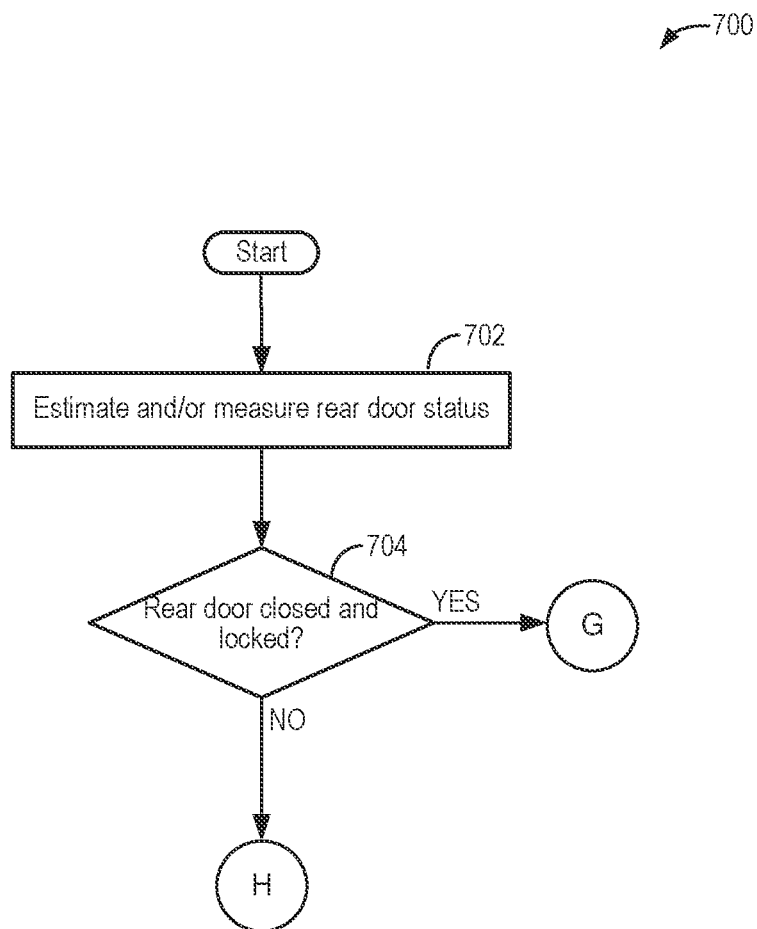
FIGS. 7A-7C show a flowchart of an example of a method for controlling the rear door of the vehicle via the automated door system.
Figure 7B:
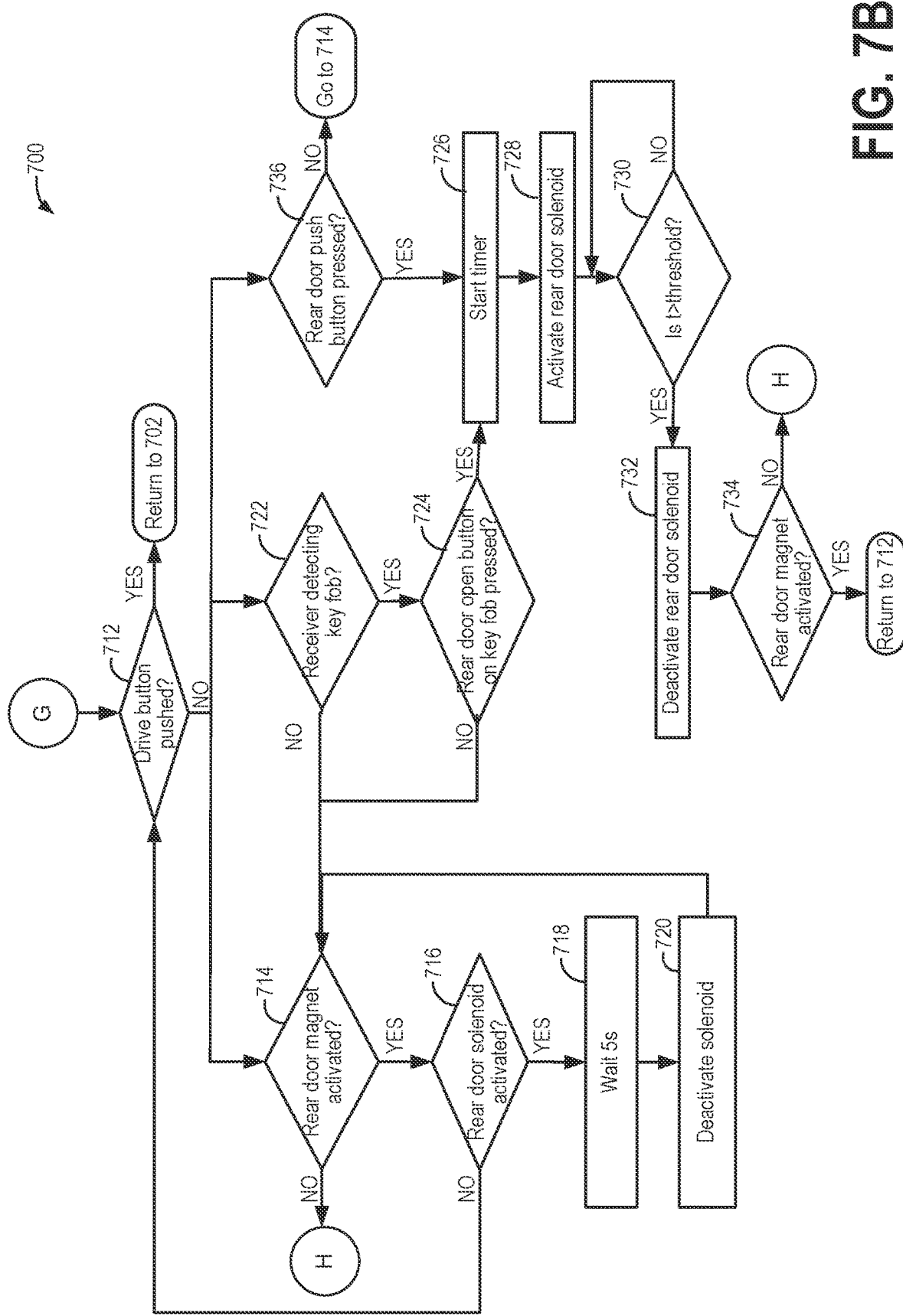
Figure 7C:
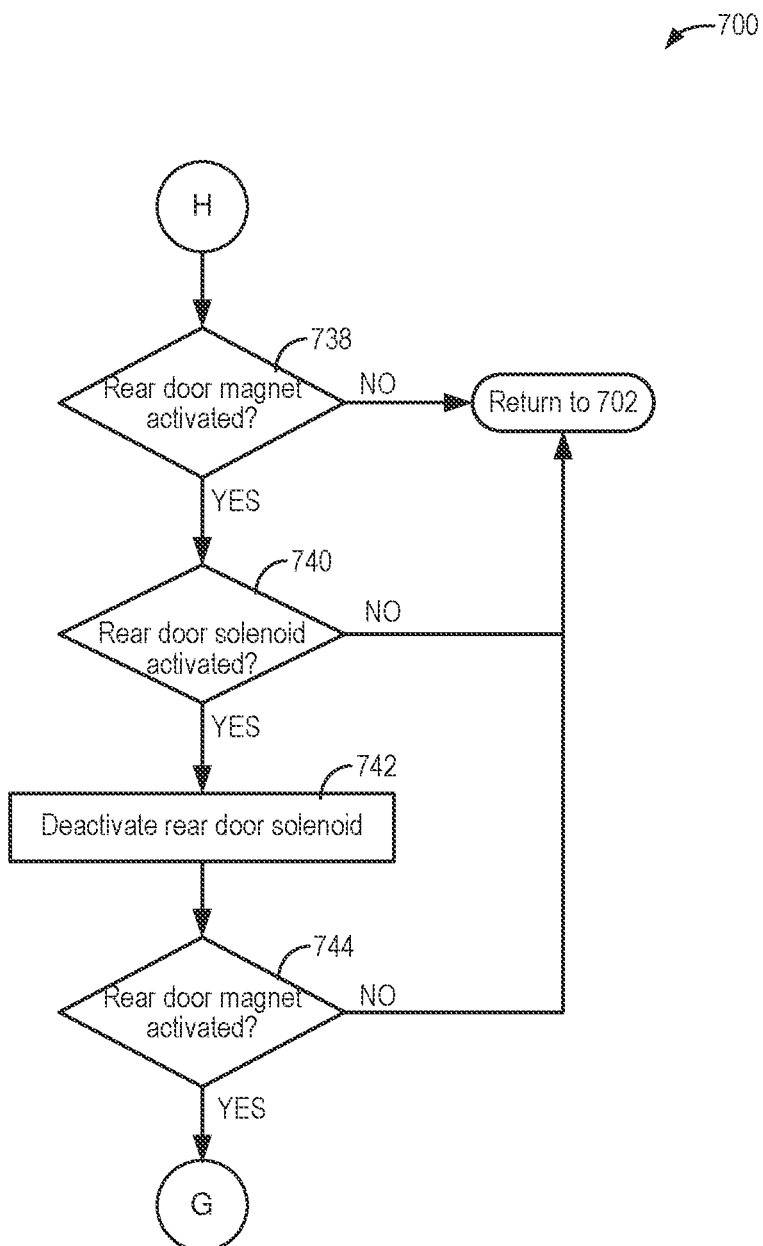

As shown in FIGS. 7A-7C, a method 700 is depicted for automated actuation of the rear door motor of the vehicle. Turning first to FIG. 7A, at 702, method 700 includes estimating and/or measuring a status of the rear door. For example, the VCU may receive data from the DCU of the rear door regarding whether the door is locked or unlocked, opened or closed, etc. At 704, the method includes confirming if the rear door is closed and locked. If the rear door is closed and locked, the method continues to FIG. 7B. If the rear door is not closed and locked, the rear door is open and the method proceeds to FIG. 7C.

Turning now to FIG. 7B, the method includes confirming if a drive button of the vehicle is pushed at 712. If the drive button is pushed, the automated door system is not available and the method returns to 702. If the drive button is not pushed, the method may proceed to a first route, including determining if a magnet of a motor at the rear door is activated at 714. If the magnet is not activated, the method proceeds to FIG. 7C. If the magnet is activated, the method continues to 716 to confirm if a solenoid of the motor of the rear door is activated. If the solenoid is not activated, the method returns to 712 to confirm if the drive button is pushed. If the solenoid is activated, the method continues to 718 to wait for 5s before proceeding to 720 to deactivate the solenoid at the rear door motor. The method returns to 714 to confirm if the magnet at the rear door motor is activated.

Returning to 712, method 700 may also follow a second route if the drive button is not pushed, including determining if a receiver at the rear door detects the key fob within a signal range of the receiver at 722. If the key fob is not detected, the method proceeds to 714 to determine if the magnet at the rear door motor is activated. If the key fob is detected, the method continues to 724 to confirm if a button for opening the rear door is pressed at the key fob. If the button is not pressed, the method proceeds to 714 to determine if the magnet at the rear door motor is activated. If the button is pressed, the method continues to 726 to start a timer. Furthermore, the solenoid at the rear door motor is activated at 728.

At 730, the method includes confirming if a duration of time elapsed at the timer reaches a threshold amount of time. The threshold amount of time may be, for example, 5 seconds, as shown at 718. If the amount of time does not reach the threshold, the method returns to 730 to confirm if the threshold is reached. If the amount of time reaches the threshold, the method continues to 732 to deactivate the solenoid at the rear door motor. The method includes confirming if the magnet at the rear door motor is activated at 734. If not activated, the method continues to FIG. 7C. If activated, the method returns to 712 to confirm if the drive button is pushed.

Returning to 712, the method may further follow a third route if the drive button is not pushed, including confirming if a push button at the rear door is pressed at 736. If the button is not pressed, the method proceeds to 714 to determine if the magnet at the rear door motor is activated. If the button is pressed, the method continues to 726 to start the timer and proceeds to 730, 732, and 734 as described above.

Turning now to FIG. 7C, at 738, method 700 includes confirming if the magnet at the rear door motor is activated. If the magnet is not activated, the method returns to 702 of FIG. 7A. If the magnet is activated, the method proceeds to 740 to confirm if the solenoid at the rear door is activated. If the solenoid is not activated, the method returns to 702 of FIG. 7A. If the solenoid is activated, the method proceeds to 742 to deactivate the solenoid at the rear door motor. At 744, the method includes confirming if the magnet at the rear door is activated. If the magnet is not activated, the method returns to 702 of FIG. 7A. If the magnet is activated, the method proceeds to FIG. 7B.

Figure 8A:
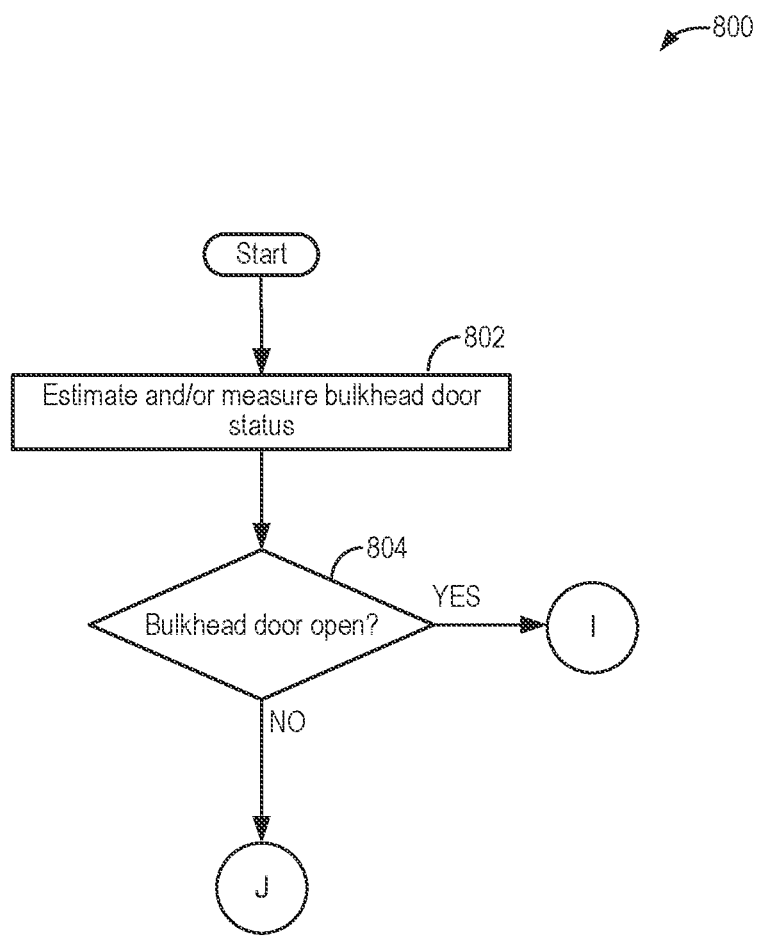
FIGS. 8A-8G show a flowchart of an example of a method for controlling the bulkhead door of the vehicle via the automated door system.

As shown in FIGS. 8A-8G, a method 800 is depicted for automated actuation of the bulkhead door motor of the vehicle in conjunction with the driver side door. Turning first to FIG. 8A, at 802, method 800 includes estimating and/or measuring a status of the bulkhead door. For example, the VCU may receive data from the DCU of the bulkhead door regarding whether the door is locked or unlocked, opened or closed, etc. At 804, the method includes confirming if the bulkhead door is open. If the bulkhead door is open, the method continues to FIG. 8B. If the bulkhead door is not open, the method proceeds to FIG. 8C.

Figure 8B:
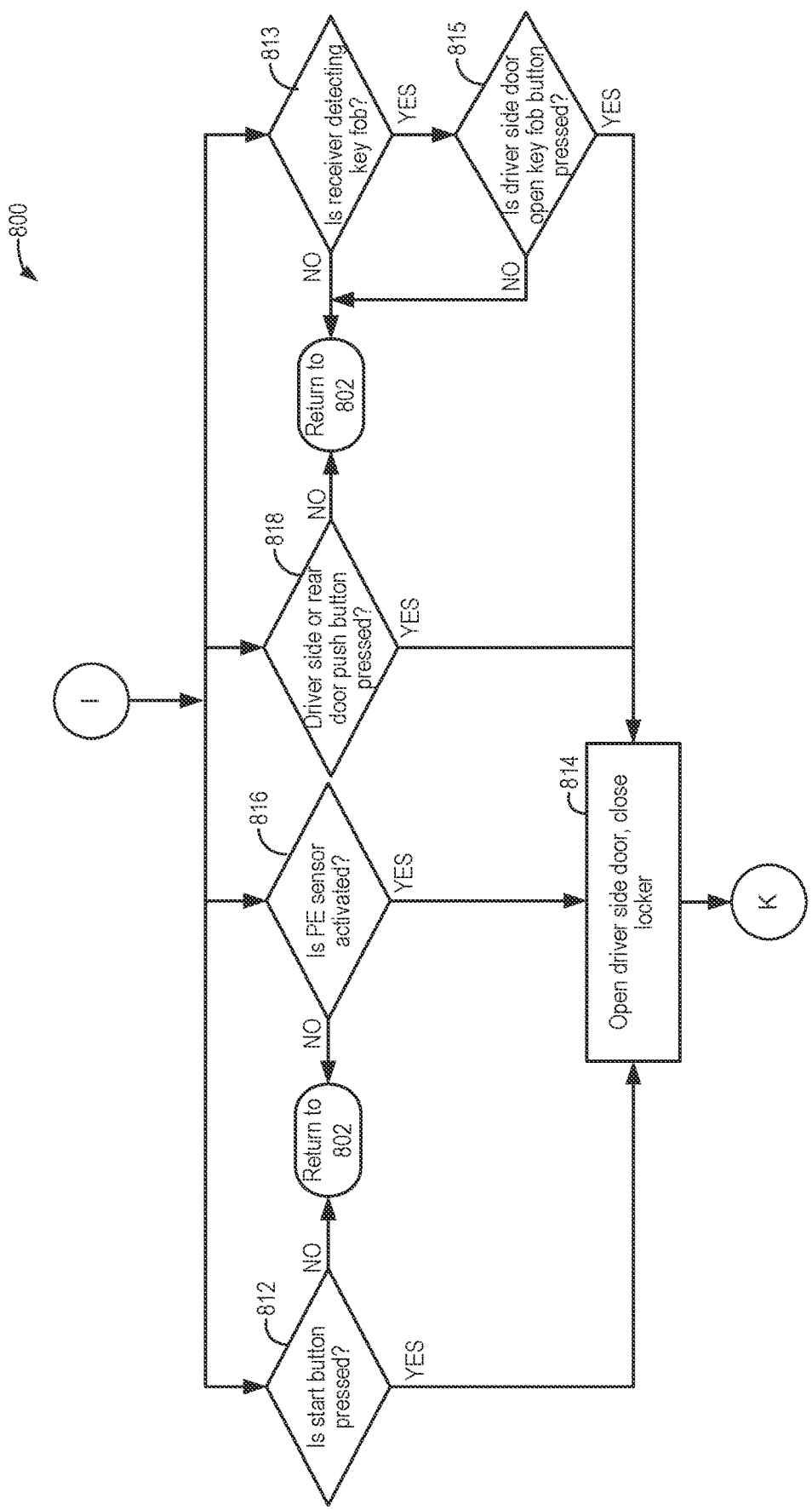

Turning now to FIG. 8B, method 800 may follow a first route, including determining if the dashboard start button is pressed at 812. If the button is not pressed, the method returns to 802 of FIG. 8A. If the start button is pressed, the method continues to 814 to command opening of the driver side door and closing of a locker. The method continues to FIG. 8D.

The method may also follow a second route, including determining if the PE sensor of the bulkhead door is activated at 816. If the PE sensor is not activated, the method returns to 802 of FIG. 8A. If the PE sensor is activated, the method proceeds to 814 to command opening of the driver side door and closing of the locker.

The method may also follow a third route, including determining if one or more of the driver side and rear door push buttons is pressed at 818. If neither of the buttons are pressed, the method returns to 802 of FIG. 8A. If at least one of the buttons are pressed, the method proceeds to 814 to open the driver side (and/or the rear door) and close the locker.

The method may also follow a fourth route, including determining if a receiver of the bulkhead door is detecting the key fob at 813. If the receiver is not detecting the key fob, the method returns to 802 of FIG. 8A. If the receiver is detecting the key fob, the method proceeds to 815 to confirm if a button activating opening of the driver side door is pressed at the key fob. If the button is not pressed, the method returns to 802. If the button is pressed, the method continues to 814 to open the driver side door and close the locker.

Figure 8C:
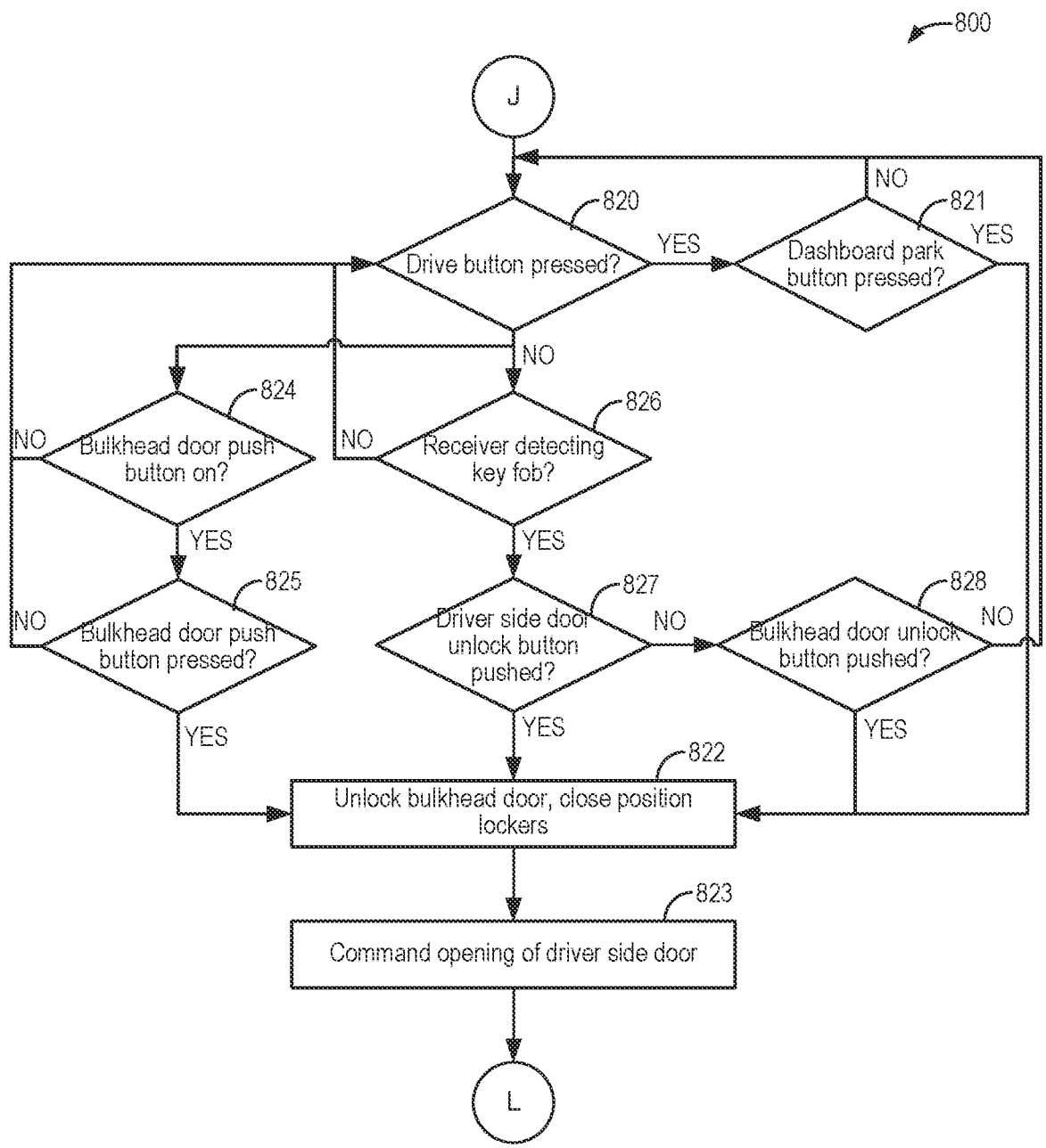

Turning now to FIG. 8C, at 820, method 800 includes confirming if a drive button of the vehicle is pressed. If the drive button is pressed, the method continues to 821 to determine if a park button at the dashboard is pressed. If the park button is not pressed, the method returns to 820. If the park button is pressed, the method continues to 822 to unlock the bulkhead door and close position lockers, e.g., electrical lockers, of the bulkhead door. The driver side door is unlocked and opened at 823 and the method continues to FIG. 8E.

Returning to 820, if the drive button is not pressed, the method may follow a first route including confirming if the bulkhead door push button is on at 824. If the button is not on, the method returns to 820. If the button is on, the method continues to 825 to confirm if the bulkhead door push button is pressed. If the button is not pressed, the method returns to 820. If the button is pressed, the method continues to 822 to unlock the bulkhead door and close the position lockers.

Returning again to 820, if the drive button is not pressed, the method may follow a second route including confirming if the receiver of the bulkhead door detects the key fob at 826. If the key fob is not detected, the method returns to 820. If the key fob is detected, the method continues to 827 to determine if the driver side door unlock button is pushed. If the button is pushed, the method continues to 822 to unlock the bulkhead door and close the position lockers. If the button is not pushed, the method proceeds to 828 to confirm if the bulkhead door unlock button is pushed. If the bulkhead door unlock button is not pushed, the method returns to 820. If the bulkhead door unlock button is pushed, the method proceeds to 822 to unlock the bulkhead door and close the position lockers.

Figure 8D:
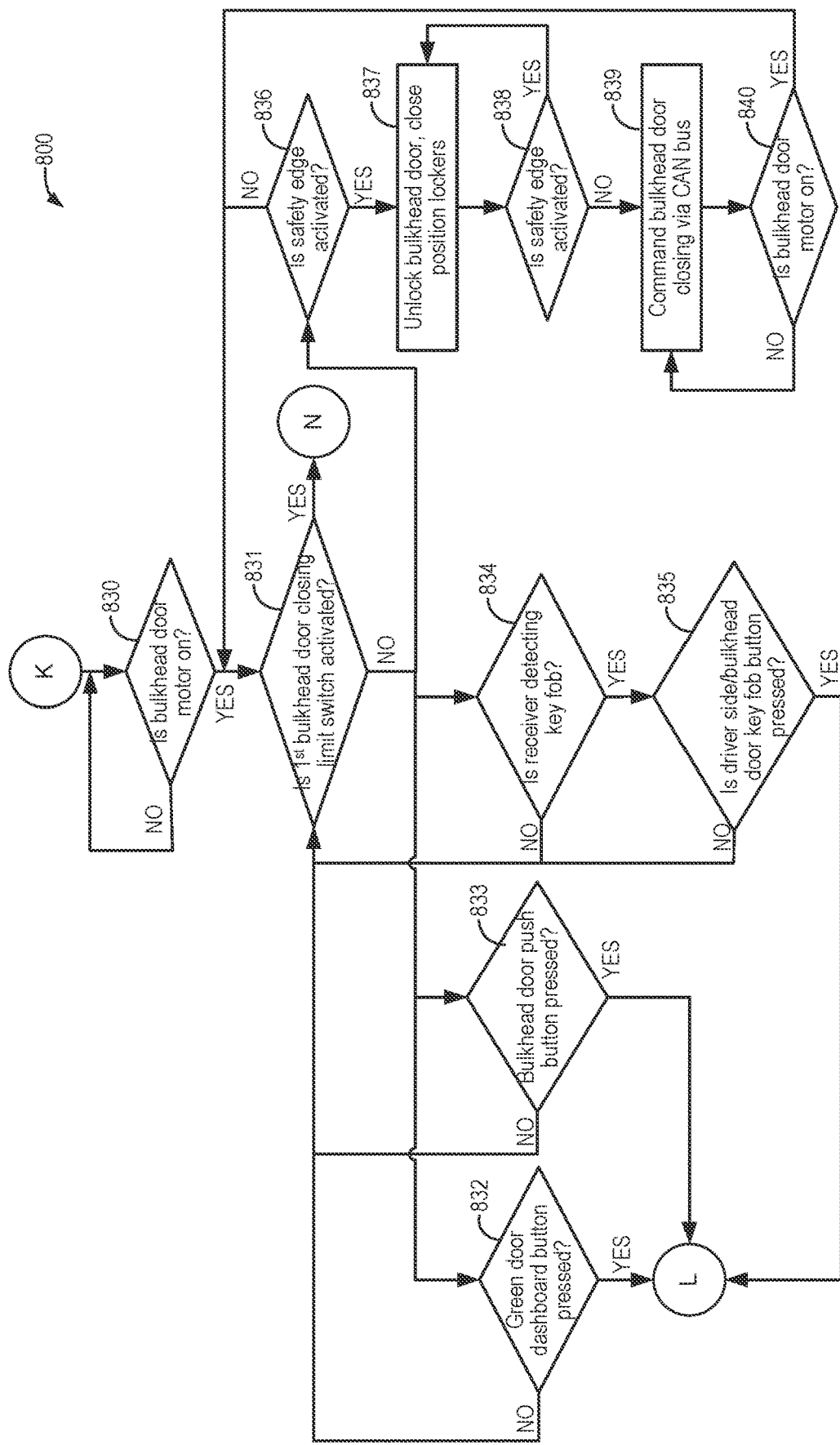

Turning now to FIG. 8D, at 830, method 800 includes confirming if a motor of the bulkhead door is on. If the motor is not on, the method returns to 830. If the motor is on, the method continues to 831 to determine if a bulkhead door closing limit switch is activated. If the switch is activated, the method continues to FIG. 8G. If the switch is not activated, the method may follow a first route including confirming if a green door dashboard button is pressed at 832, e.g., a dashboard button for commanding. If the green door dashboard button is not pressed, the method returns to 831. If the green door dashboard button is pressed, the method continues to FIG. 8E.

Returning to 831, if the switch is not activated, the method may follow a second route including confirming if a bulkhead door push button is pressed at 833. If the bulkhead door push button is not pressed, the method returns to 831. If the bulkhead door push button is pressed, the method continues to FIG. 8E.

Returning to 831, if the switch is not activated, the method may follow a third route including determining if the bulkhead door receiver is detecting the key fob at 834. If the key fob is not detected, the method returns to 831. If the key fob is detected, the method proceeds to 835 to confirm if one or more of the driver side and bulkhead door key fob buttons is pressed. If neither of the buttons are pressed, the method returns to 831. If one or more of the buttons is pressed, the method continues to FIG. 8E.

Returning to 831, if the switch is not activated, the method may follow a fourth route including determining if a safety edge sensor is activated at 836. The safety edge sensor may be a touch-sensitive switch arranged at an edge of a motorized door configured to transmit data to adjust a state of the door motor. If the safety edge sensor is not activated, the method returns to 831. If the safety edge sensor is activated, the method continues to 837 to unlock the bulkhead door and close the position lockers for the driver side door and rear door.

At 838, the method includes confirming again if the safety edge sensor is activated. If the safety edge sensor is activated, the method returns to 837. If the safety edge sensor is not activated, the method proceeds to 839 to command closing of the bulkhead door via a CAN bus of the vehicle. The method includes confirming if the bulkhead door motor is on at 840. If the motor is not on, the method returns to 839. If the motor is on, the method returns to 831.

Figure 8E:
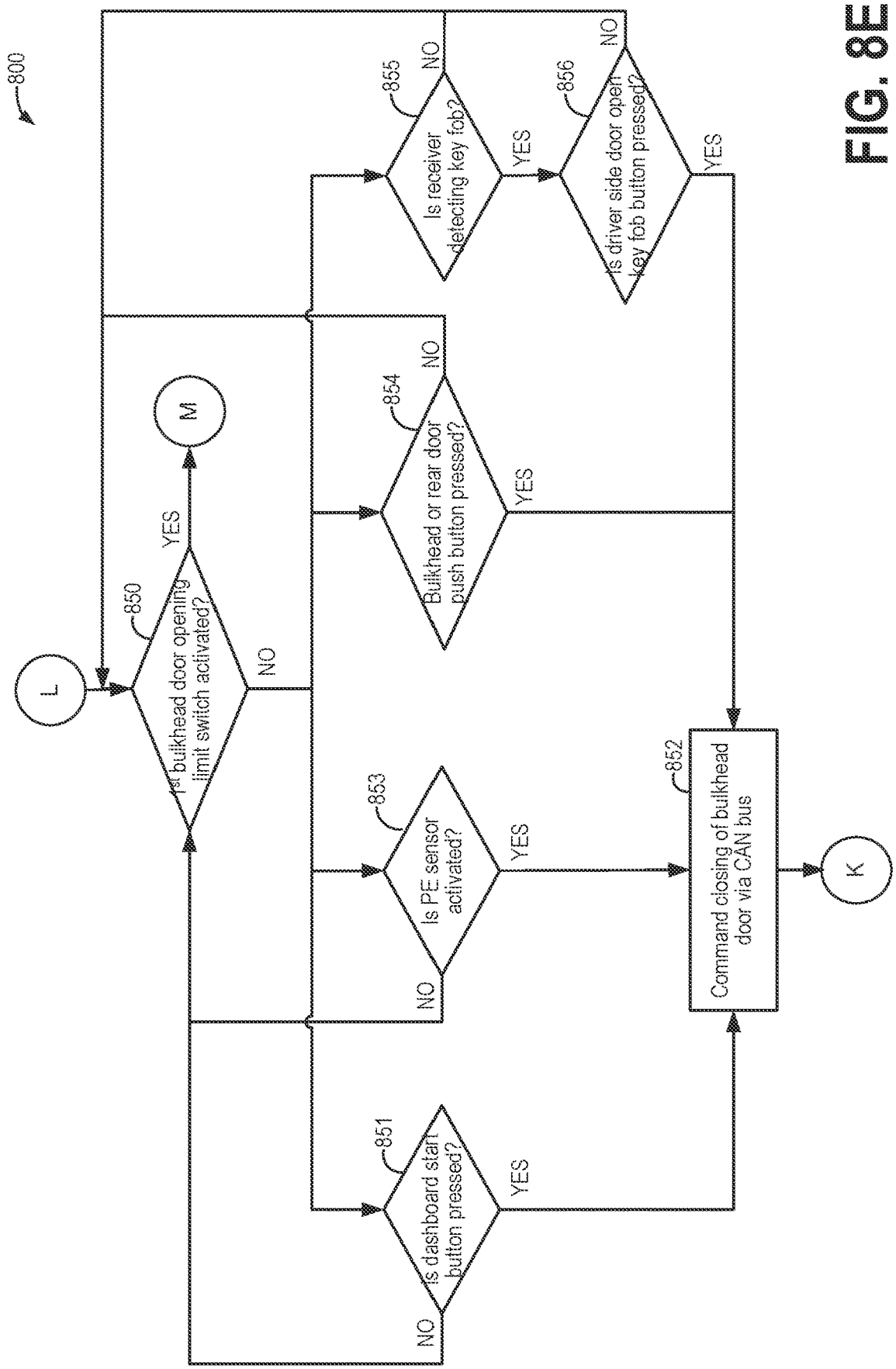

Turning now to FIG. 8E, at 850, method 800 includes confirming if a first bulkhead door opening limit switch is activated. If the switch is activated, the method proceeds to FIG. 8F. If the switch is not activated, the method may follow a first route, including confirming if the dashboard start button is pressed at 851. If the dashboard start button is not pressed, the method returns to 850. If the dashboard start button is pressed, the method continues to 852 to command closing of the bulkhead door via the CAN bus. The method continues to FIG. 8D.

Returning to 850, if the switch is not activated, the method may follow a second route including confirming if the PE sensor of the bulkhead door is activated at 853. If the PE sensor is not activated, the method returns to 850. If the PE sensor is activated, the method proceeds to 852 to command closing of the bulkhead door.

Returning to 850, if the switch is not activated, the method may follow a third route including determining if one or more of the bulkhead and rear door push button is pressed at 854. If neither button is pressed, the method returns to 850. If at least one button is pressed, the method continues to 852 to command closing of the bulkhead door.

Returning to 850, if the switch is not activated, the method may follow a fourth route including confirming if the bulkhead door receiver is detecting the key fob at 855. If the key fob is not detected, the method returns to 850. If the key fob is detected, the method continues to 856 to determine if the driver side door open key fob button is pressed. If the button is not pressed, the method returns to 850. If the button is pressed, the method proceeds to 852 to command closing of the bulkhead door.

Figure 8F:
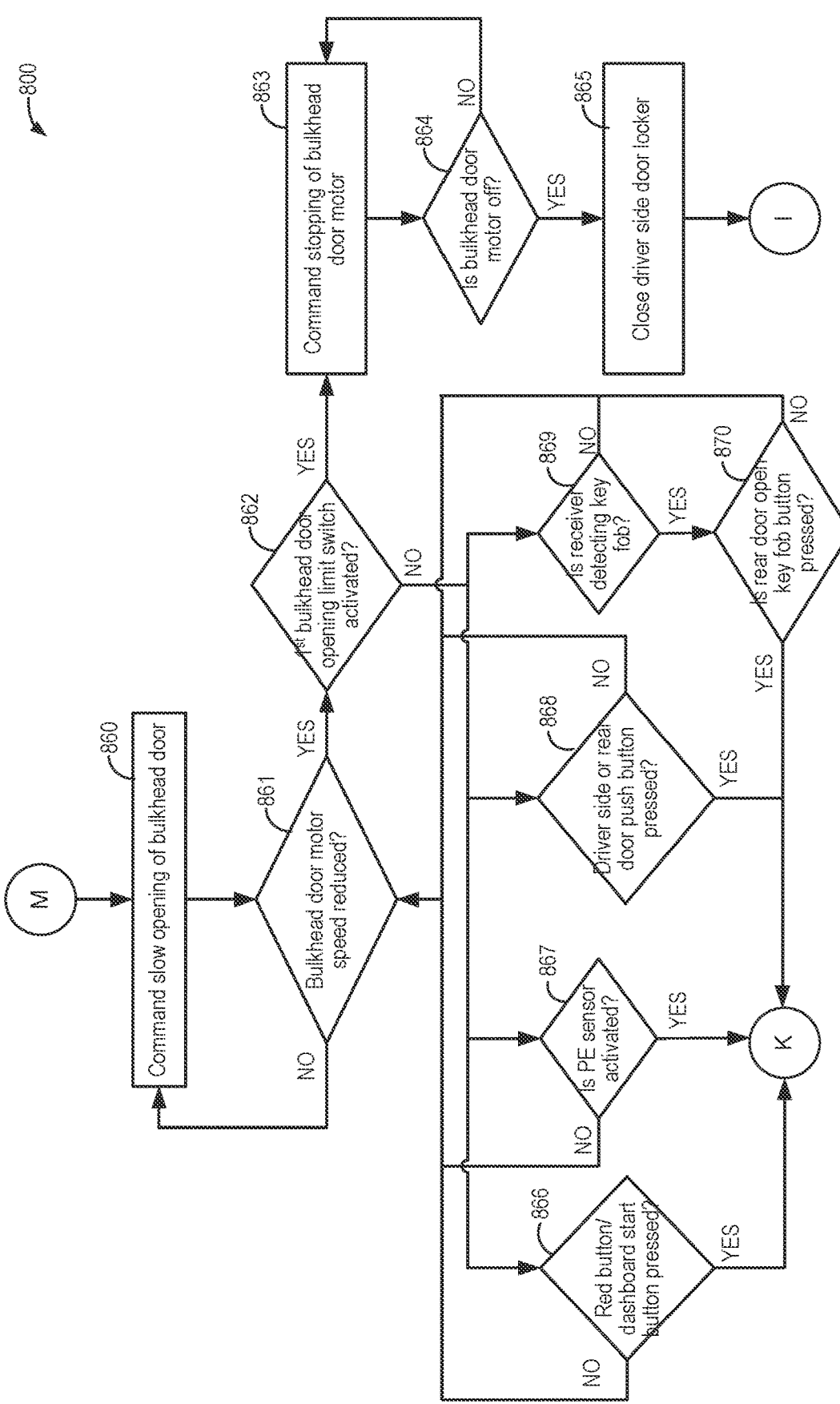

Turning now to FIG. 8F, at 860, method 800 includes commanding the bulkhead door to be opened slowly. The method includes determining if a speed of the bulkhead door motor is reduced at 861. If the speed is not reduced, the method returns to 860. If the speed is reduced, the method continues to 862 to determine if the first bulkhead door opening limit switch is activated at 862. If the switch is activated, the method continues to 863 to command stopping of the bulkhead door motor.

At 864, the method includes confirming if the bulkhead door motor is off. If the motor is not off, the method returns to 863. If the motor is off, the method continues to 865 to close a driver side door locker, e.g., a locker switch is adjusted to maintain the driver side door closed regardless of requests to open the driver side door. The method continues to FIG. 8B.

Returning to 862, if the first bulkhead door opening limit switch is not activated, the method may follow a first route including confirming if one or more of a red button and the dashboard start button is pressed at 866. If neither button is pressed, the method returns to 861. If at least one button is pressed, the method continues to FIG. 8D.

Returning to 862, if the switch is not activated, the method may follow a second route including confirming if the bulkhead door PE sensor is activated at 867. If the PE sensor is not activated, the method returns to 861. If the PE sensor is activated, the method proceeds to FIG. 8D.

Returning to 862, if the switch is not activated, the method may follow a third route including determining if one or more of the driver side and rear door push button is pressed at 868. If neither button is pressed, the method returns to 861. If at least one button is pressed, the method continues to FIG. 8D.

Returning to 862, if the switch is not activated, the method may follow a fourth route including confirming if the bulkhead door receiver is detecting the key fob at 869. If the receiver is not detecting the key fob, the method returns to 861. If the receiver is detecting the key fob, the method continues to 870 to determine if the rear door open key fob button is pressed. If the button is not pressed, the method returns to 861. If the button is pressed, the method proceeds to FIG. 8D.

Figure 8G:
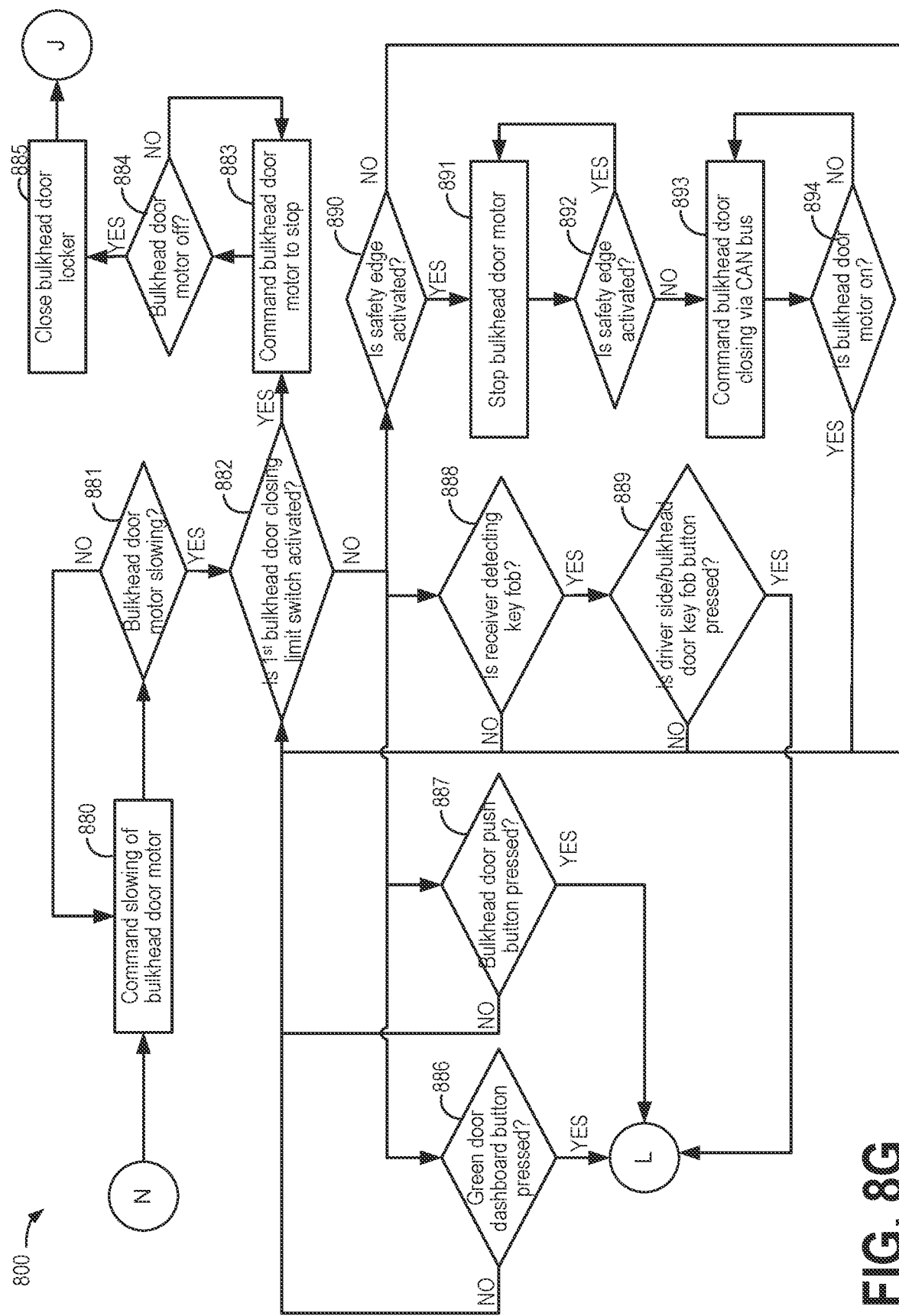

Turning now to FIG. 8G, at 880, method 800 includes commanding a speed of the bulkhead door motor to be reduced. The method includes confirming if the bulkhead door motor is slowing at 881. If the motor is not decreasing in speed, the method returns to 880. If the motor is operating slower, the method continues to 882 to determine if the first bulkhead door closing limit switch is activated. If the switch is activated, the method includes commanding the bulkhead door motor to stop at 883. The method proceeds to 884 to confirm if the bulkhead door motor is off. If the motor is not off, the method returns to 883. If the motor is off, the method continues to 885 to close the bulkhead door locker. The method proceeds to FIG. 8C.

Returning to 882, if the first bulkhead door closing limit switch is not activated at 882, the method may follow a first route including confirming if the green door dashboard button is pressed at 886. If the green door dashboard button is not pressed, the method returns to 882. If the green door dashboard button is pressed, the method continues to FIG. 8E.

Returning to 882, if the first bulkhead door closing limit switch is not activated, the method may follow a second route including confirming if a bulkhead door push button is pressed at 887. If the bulkhead door push button is not pressed, the method returns to 882. If the bulkhead door push button is pressed, the method continues to FIG. 8E.

Returning to 882, if the first bulkhead door closing limit switch is not activated, the method may follow a third route including determining if the bulkhead door receiver is detecting the key fob at 888. If the key fob is not detected, the method returns to 882. If the key fob is detected, the method proceeds to 889 to confirm if one or more of the driver side and bulkhead door key fob buttons is pressed. If neither of the buttons are pressed, the method returns to 882. If one or more of the buttons is pressed, the method continues to FIG. 8E.

Returning to 882, if the first bulkhead door closing limit switch is not activated, the method may follow a fourth route including determining if the safety edge sensor is activated at 890. If the safety edge sensor is not activated, the method returns to 882. If the safety edge sensor is activated, the method continues to 891 to stop, e.g., deactivate, the bulkhead door motor.

At 892, the method includes confirming again if the safety edge sensor is activated. If the safety edge sensor is activated, the method returns to 891. If the safety edge sensor is not activated, the method proceeds to 893 to command closing of the bulkhead door via the CAN bus of the vehicle. The method includes confirming if the bulkhead door motor is on at 894. If the motor is not on, the method returns to 893. If the motor is on, the method returns to 882.

Figure 9A:
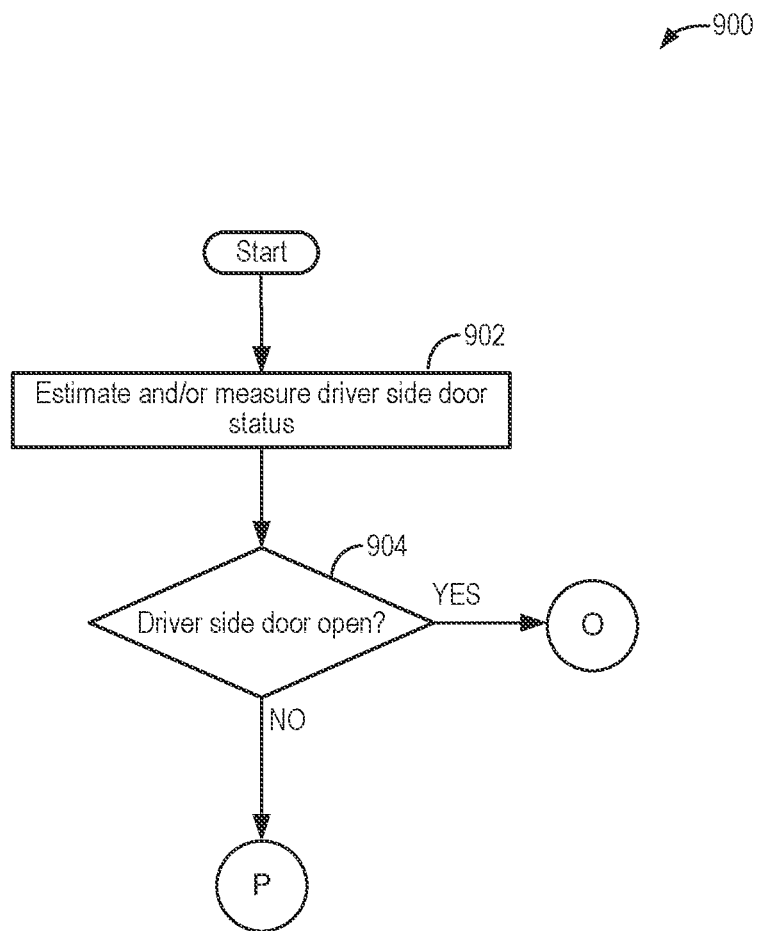
FIGS. 9A-9G show a flowchart of an example of a method for controlling the driver side door of the vehicle via the automated door system.

FIGS. 9A-9G show a method 900 for automated actuation of the driver side door motor of the vehicle. Turning first to FIG. 9A, at 902, method 900 includes estimating and/or measuring a status of the driver side door. For example, the VCU may receive data from the DCU of the driver side door regarding whether the door is locked or unlocked, opened or closed, etc. At 904, the method includes confirming if the driver side door is open. If the driver side door is open, the method continues to FIG. 9B. If the driver side door is not open, the method proceeds to FIG. 9C.

Figure 9B:
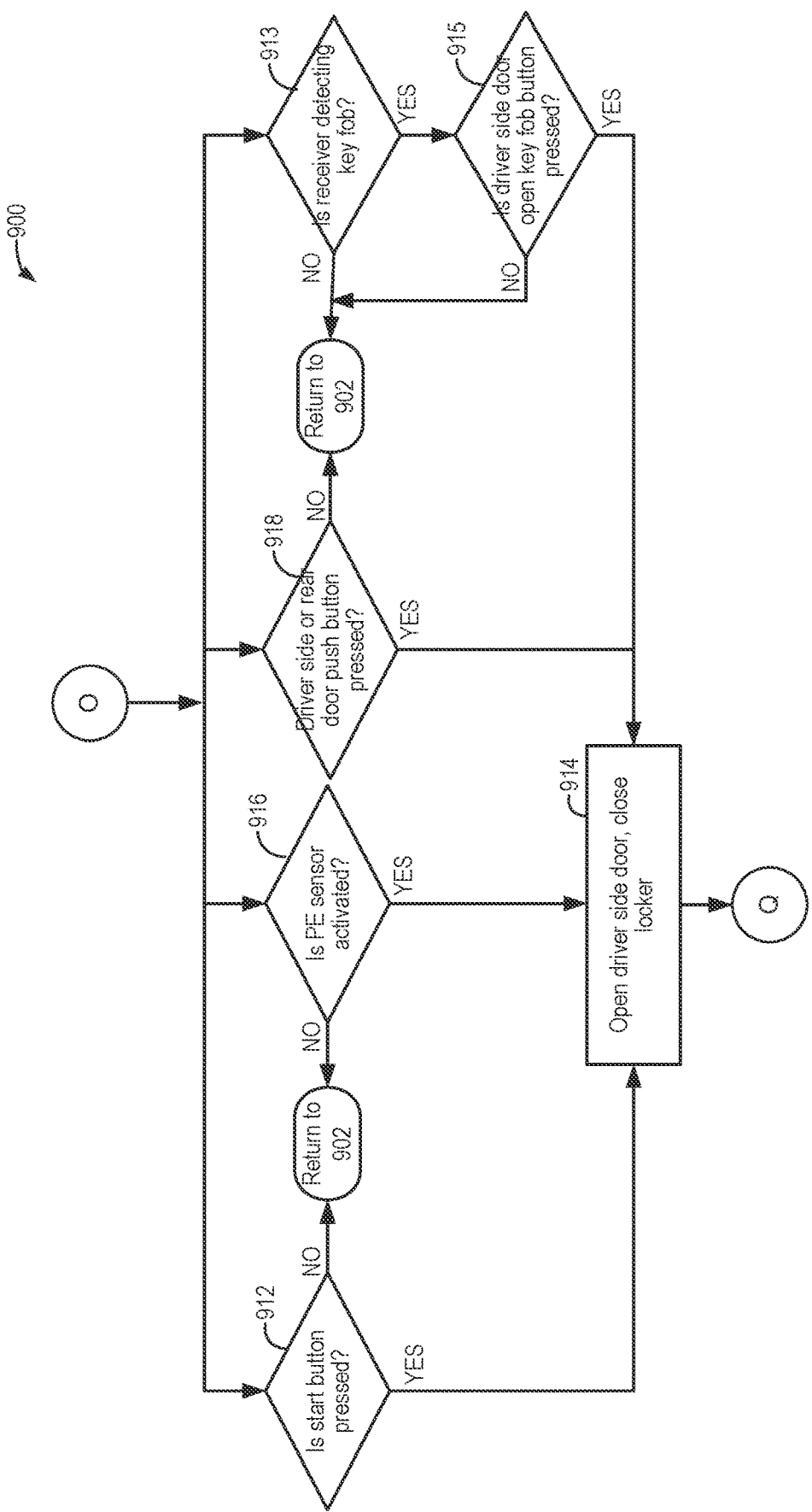

Turning now to FIG. 9B, method 900 may follow a first route, including determining if the dashboard start button is pressed at 912. If the button is not pressed, the method returns to 902 of FIG. 9A. If the start button is pressed, the method continues to 914 to command opening of the driver side door and closing of the locker. The method continues to FIG. 9D.

The method may also follow a second route, including determining if the PE sensor of the driver side door is activated at 916. If the PE sensor is not activated, the method returns to 902 of FIG. 9A. If the PE sensor is activated, the method proceeds to 914 to command opening of the driver side door and closing of the locker.

The method may also follow a third route, including determining if one or more of the driver side and rear door push buttons is pressed at 918. If neither of the buttons are pressed, the method returns to 902 of FIG. 9A. If at least one of the buttons are pressed, the method proceeds to 914 to open the driver side (and/or the rear door) and close the locker.

The method may also follow a fourth route, including determining if a receiver of the bulkhead door is detecting the key fob at 913. If the receiver is not detecting the key fob, the method returns to 902 of FIG. 9A. If the receiver is detecting the key fob, the method proceeds to 915 to confirm if button activating opening of the driver side door is pressed at the key fob. If the button is not pressed, the method returns to 902. If the button is pressed, the method continues to 914 to open the driver side door and close the locker.

Figure 9C:
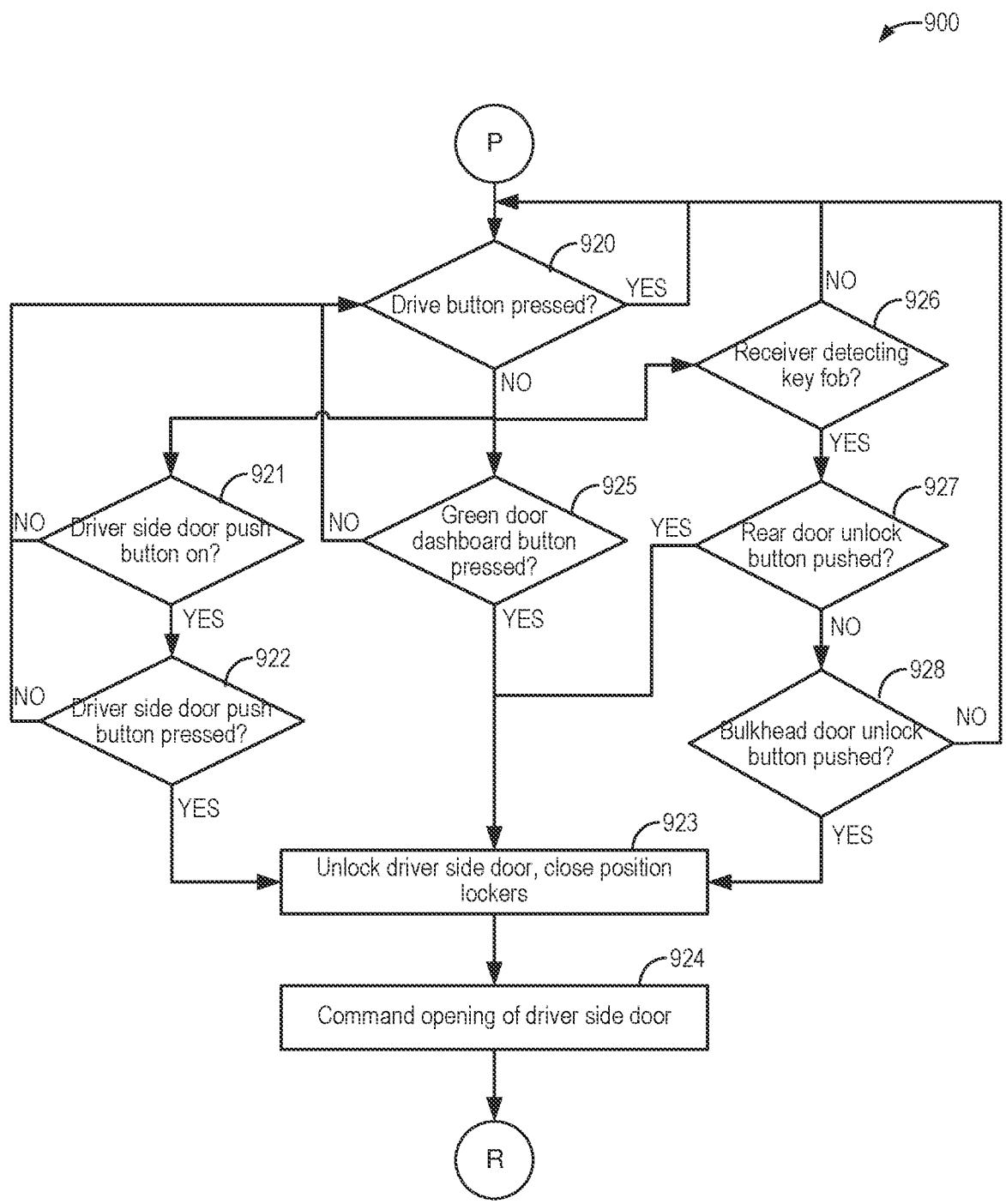

Turning now to FIG. 9C, at 920, method 900 includes confirming if a drive button of the vehicle is pressed. If the drive button is pressed, the method returns to 920. If the drive button is not pressed, the method may follow a first route including confirming if the driver side door push button is on at 921. If the button is not on, the method returns to 920. If the button is on, the method continues to 922 to confirm if the driver side door push button is pressed. If the button is not pressed, the method returns to 920. If the button is pressed, the method continues to 923 to unlock the driver side door and close the position lockers of the rear door, as well as the bulkhead doors, in some examples. The driver side door is commanded to open at 924 and the method continues to FIG. 9E.

Returning to 920, if the drive button is not pressed, the method may follow a second route including confirming if the green door dashboard button is pressed at 925. If the green door dashboard button is not pressed, the method returns to 920. If the green door dashboard button is pressed, the method proceeds to 923 to unlock the driver side door and close the position lockers.

Returning again to 920, if the drive button is not pressed, the method may follow a third route including confirming if the receiver of the driver side door detects the key fob at 926. If the key fob is not detected, the method returns to 920. If the key fob is detected, the method continues to 927 to determine if the rear door unlock button is pushed. If the button is pushed, the method continues to 923 to unlock the driver side door and close the position lockers. If the button is not pushed, the method proceeds to 928 to confirm if the bulkhead door unlock button is pushed. If the bulkhead door unlock button is not pushed, the method returns to 920. If the bulkhead door unlock button is pushed, the method proceeds to 923 to unlock the driver side door and close the position lockers.

Figure 9D:
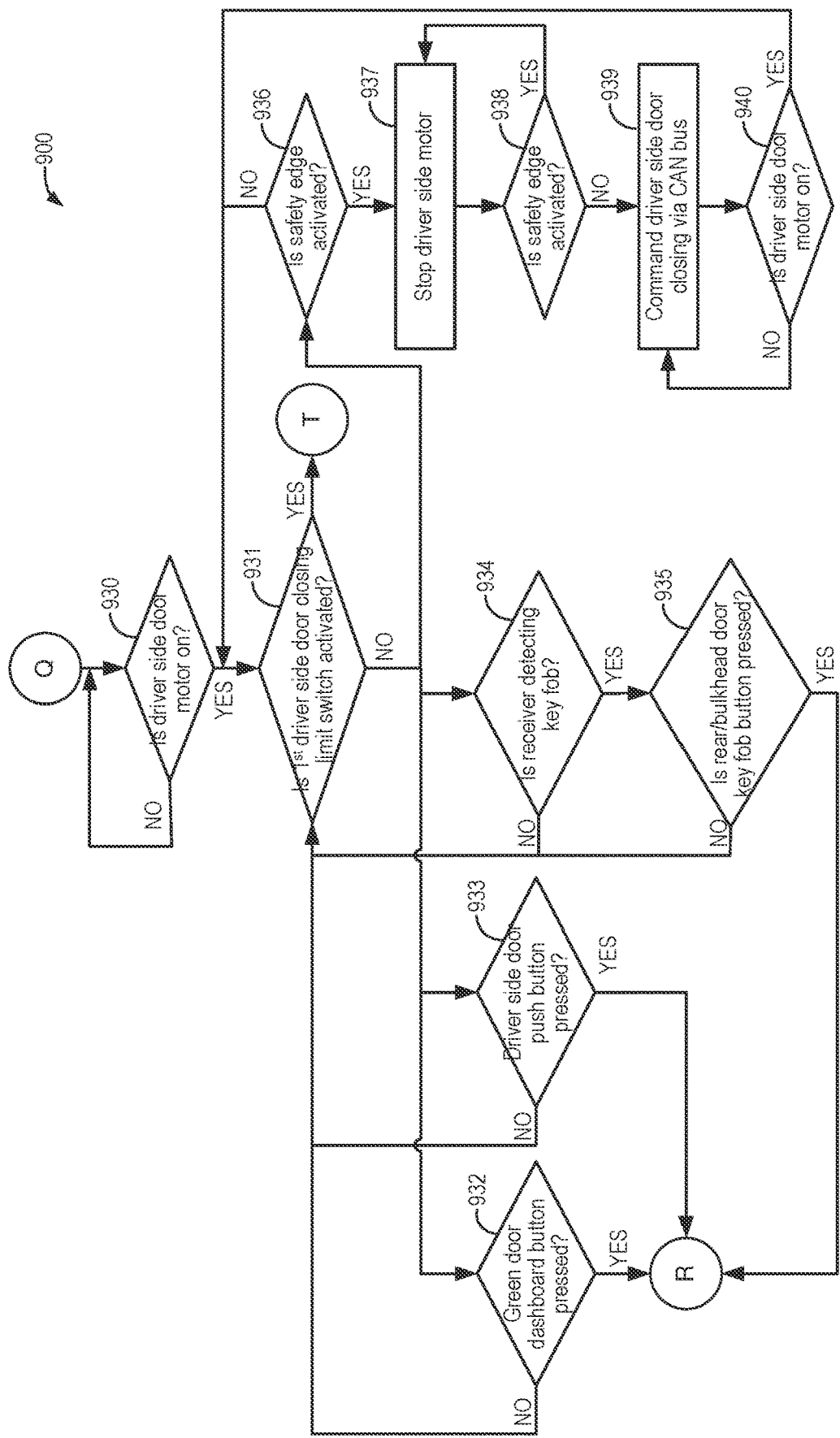

Turning now to FIG. 9D, at 930, method 900 includes confirming if a motor of the driver side door is on. If the motor is not on, the method returns to 930. If the motor is on, the method continues to 931 to determine if a driver side door closing limit switch is activated. If the switch is activated, the method continues to FIG. 9G. If the switch is not activated, the method may follow a first route including confirming if the green door dashboard button is pressed at 932. If the green door dashboard button is not pressed, the method returns to 931. If the green door dashboard button is pressed, the method continues to FIG. 9E.

Returning to 931, if the switch is not activated, the method may follow a second route including confirming if the driver side door push button is pressed at 933. If the driver side door push button is not pressed, the method returns to 931. If the driver side door push button is pressed, the method continues to FIG. 9E.

Returning to 931, if the switch is not activated, the method may follow a third route including determining if the driver side door receiver is detecting the key fob at 934. If the key fob is not detected, the method returns to 931. If the key fob is detected, the method proceeds to 935 to confirm if one or more of the rear and bulkhead door key fob buttons are pressed. If neither of the buttons are pressed, the method returns to 931. If one or more of the buttons are pressed, the method continues to FIG. 9E.

Returning to 931, if the switch is not activated, the method may follow a fourth route including determining if the safety edge sensor is activated at 936. If the safety edge sensor is not activated, the method returns to 931. If the safety edge sensor is activated, the method continues to 937 to stop the driver side motor.

At 938, the method includes confirming again if the safety edge sensor is activated. If the safety edge sensor is activated, the method returns to 937. If the safety edge sensor is not activated, the method proceeds to 939 to command closing of the driver side door via the CAN bus of the vehicle. The method includes confirming if the driver side door motor is on at 940. If the motor is not on, the method returns to 939. If the motor is on, the method returns to 931.

Figure 9E:
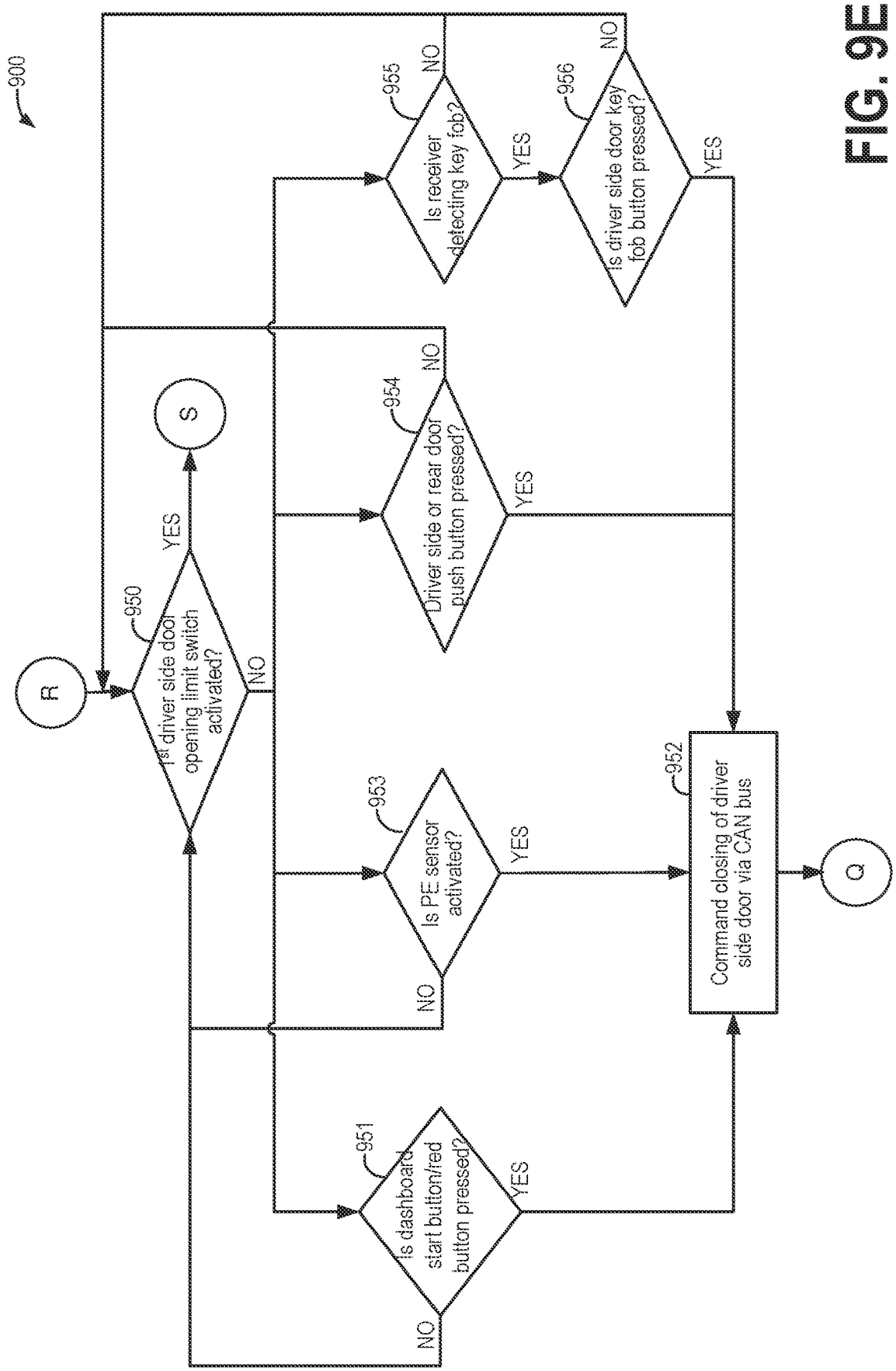

Turning now to FIG. 9E, at 950, method 900 includes confirming if a first driver side door opening limit switch is activated. If the switch is activated, the method proceeds to FIG. 9F. If the switch is not activated, the method may follow a first route, including confirming if the dashboard start button or red dashboard button is pressed at 951. If neither button is pressed, the method returns to 950. If at least one button is pressed, the method continues to 952 to command closing of the driver side door via the CAN bus. The method continues to FIG. 9D.

Returning to 950, if the switch is not activated, the method may follow a second route including confirming if the PE sensor of the driver side door is activated at 953. If the PE sensor is not activated, the method returns to 950. If the PE sensor is activated, the method proceeds to 952 to command closing of the driver side door.

Returning to 950, if the switch is not activated, the method may follow a third route including determining if one or more of the driver side and rear door push buttons are pressed at 954. If neither button is pressed, the method returns to 950. If at least one button is pressed, the method continues to 952 to command closing of the driver side door.

Returning to 950, if the switch is not activated, the method may follow a fourth route including confirming if the driver side door receiver is detecting the key fob at 955. If the key fob is not detected, the method returns to 950. If the key fob is detected, the method continues to 956 to determine if the driver side door key fob button is pressed. If the button is not pressed, the method returns to 950. If the button is pressed, the method proceeds to 952 to command closing of the driver side door.

Figure 9F:
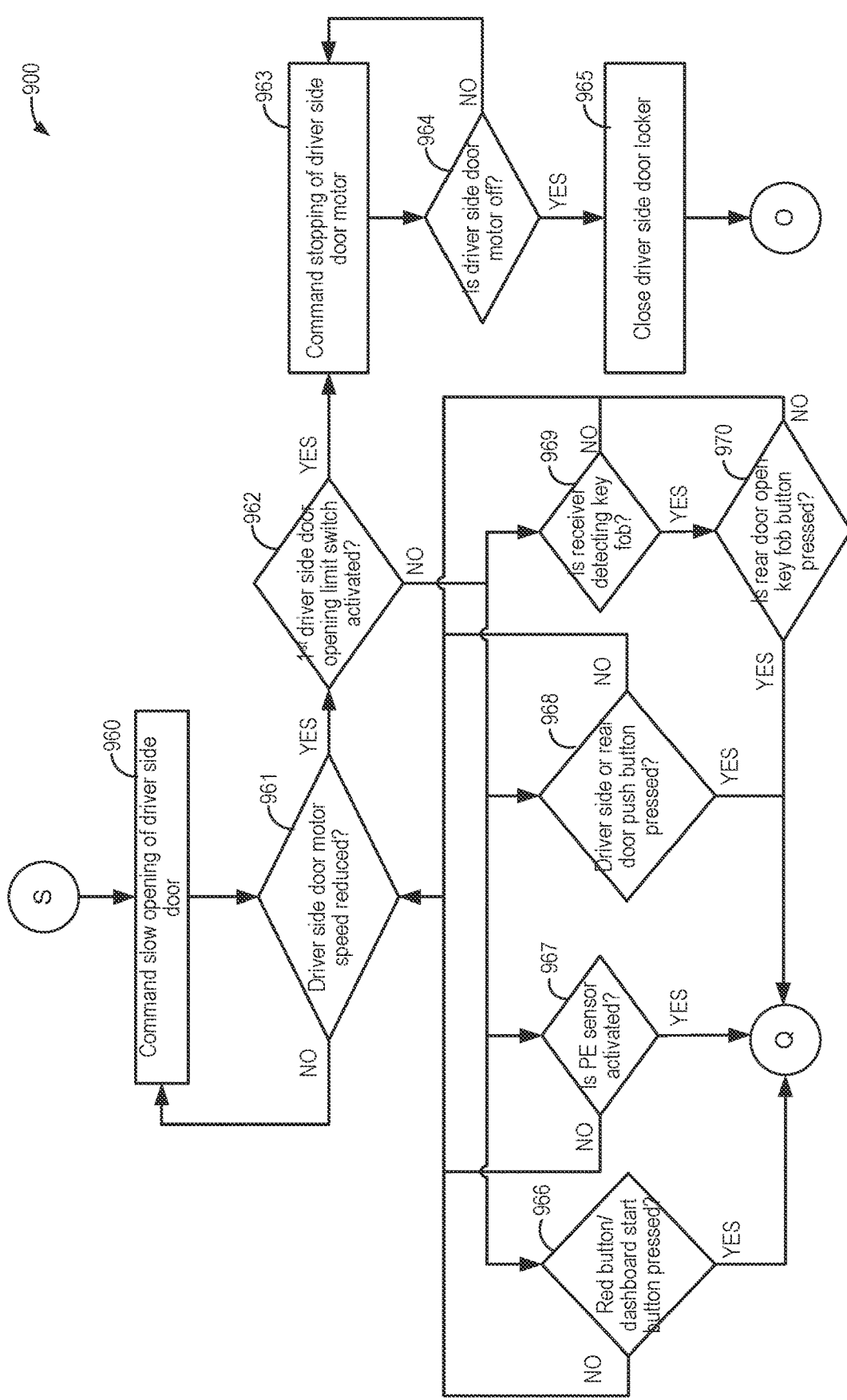

Turning now to FIG. 9F, at 960, method 900 includes commanding the driver side door to be opened slowly. The method includes determining if a speed of the driver side door motor is reduced at 961. If the speed is not reduced, the method returns to 960. If the speed is reduced, the method continues to 962 to determine if the first driver side door opening limit switch is activated at 962. If the switch is activated, the method continues to 963 to command stopping of the driver side door motor.

At 964, the method includes confirming if the driver side door motor is off. If the motor is not off, the method returns to 963. If the motor is off, the method continues to 965 to close the driver side door locker. The method continues to FIG. 9B.

Returning to 962, if the first bulkhead door opening limit switch is not activated, the method may follow a first route including confirming if one or more of the red button and the dashboard start button is pressed at 966. If neither button is pressed, the method returns to 961. If at least one button is pressed, the method continues to FIG. 9D.

Returning to 962, if the switch is not activated, the method may follow a second route including confirming if the driver side door PE sensor is activated at 967. If the PE sensor is not activated, the method returns to 961. If the PE sensor is activated, the method proceeds to FIG. 9D.

Returning to 962, if the switch is not activated, the method may follow a third route including determining if one or more of the driver side and rear door push button is pressed at 968. If neither button is pressed, the method returns to 961. If at least one button is pressed, the method continues to FIG. 9D.

Returning to 962, if the switch is not activated, the method may follow a fourth route including confirming if the driver side door receiver is detecting the key fob at 969. If the receiver is not detecting the key fob, the method returns to 961. If the receiver is detecting the key fob, the method continues to 970 to determine if the rear door open key fob button is pressed. If the button is not pressed, the method returns to 961. If the button is pressed, the method proceeds to FIG. 9D.

Figure 9G:
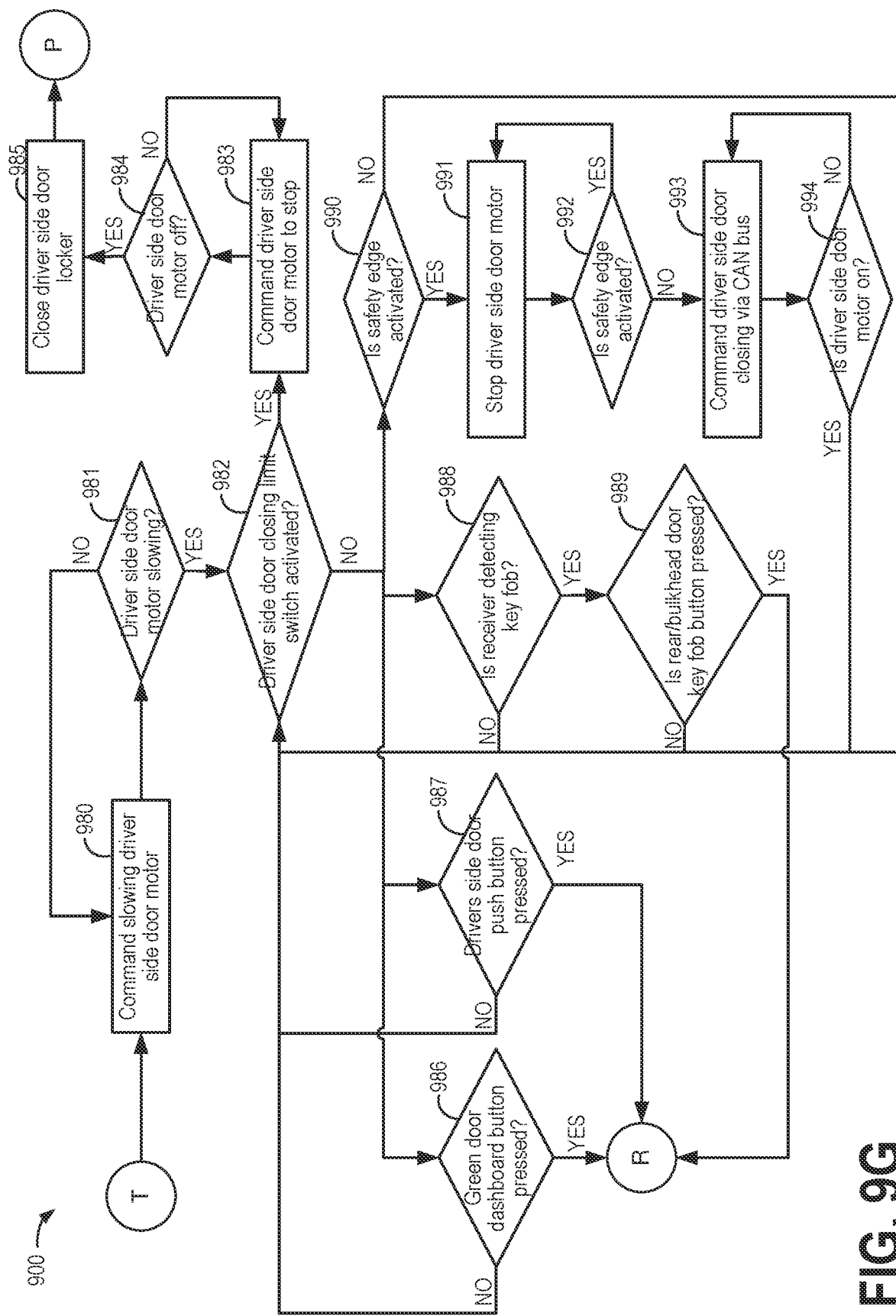

Turning now to FIG. 9G, at 980, method 900 includes commanding a speed of the driver side door motor to be reduced. The method includes confirming if the driver side door motor is slowing at 981. If the motor is not decreasing in speed, the method returns to 980. If the motor is operating slower, the method continues to 982 to determine if the first driver side door closing limit switch is activated. If the switch is activated, the method includes commanding the driver side door motor to stop at 983. The method proceeds to 984 to confirm if the driver side door motor is off. If the motor is not off, the method returns to 983. If the motor is off, the method continues to 985 to close the driver side door locker. The method proceeds to FIG. 9C.

Returning to 982, if the first driver side door closing limit switch is not activated at 982, the method may follow a first route including confirming if the green door dashboard button is pressed at 986. If the green door dashboard button is not pressed, the method returns to 982. If the green door dashboard button is pressed, the method continues to FIG. 9E.

Returning to 982, if the first driver side door closing limit switch is not activated, the method may follow a second route including confirming if a driver side door push button is pressed at 987. If the driver side door push button is not pressed, the method returns to 982. If the driver side door push button is pressed, the method continues to FIG. 9E.

Returning to 982, if the first driver side door closing limit switch is not activated, the method may follow a third route including determining if the driver side door receiver is detecting the key fob at 988. If the key fob is not detected, the method returns to 982. If the key fob is detected, the method proceeds to 989 to confirm if one or more of the rear and bulkhead door key fob buttons is pressed. If neither of the buttons are pressed, the method returns to 982. If one or more of the buttons is pressed, the method continues to FIG. 9E.

Returning to 982, if the first driver side door closing limit switch is not activated, the method may follow a fourth route including determining if the safety edge sensor is activated at 990. If the safety edge sensor is not activated, the method returns to 982. If the safety edge sensor is activated, the method continues to 991 to stop, e.g., deactivate, the driver side door motor.

At 992, the method includes confirming again if the safety edge sensor is activated. If the safety edge sensor is activated, the method returns to 991. If the safety edge sensor is not activated, the method proceeds to 993 to command closing of the driver side door via the CAN bus of the vehicle. The method includes confirming if the driver side door motor is on at 994. If the motor is not on, the method returns to 993. If the motor is on, the method returns to 982.

In this way, easier access to a medium-duty vehicle may be enabled by implementing the vehicle with an automated door system as well as adjustable floor height. The automated door system may allow a position of a user to be monitored and, in anticipation of use of a vehicle door, the vehicle door may be automatically unlocked and opened to mitigate manual manipulation of the door. The vehicle may also be commanded to kneel, e.g., lower the floor height, to reduce an effort of unloading/loading the vehicle.

The technical effect of adapting the vehicle with the automated door system is that door motors and locking switches may be controlled via a combination of RFID and photoelectric sensing technology.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

The disclosure also provides support for an automated door system for a vehicle, comprising: a key fob configured with a transmitter, a set of sensors located at a door of the vehicle, the set of sensors communicatively linked to a vehicle control unit and configured to monitor a position of the key fob relative to the door, and wherein the set of sensors includes one or more of an RFID tag and a photoelectric sensor. In a first example of the system, the set of sensors are included in a door control unit (DCU) of the vehicle and wherein the DCU receives instructions from the vehicle control unit. In a second example of the system, optionally including the first example, the vehicle control unit is configured to instruct the DCU to adjust a status of the door based on a state of the vehicle, and wherein the status of the door includes locking/unlocking the door and opening/closing the door. In a third example of the system, optionally including one or both of the first and second examples, the status of the door is adjusted based on detection of the key fob by the set of sensors within a threshold proximity to the door. In a fourth example of the system, optionally including one or more or each of the first through third examples, the DCU further comprises one or more of control buttons on a vehicle user interface to control opening and unlocking of the door and a push button at the door to control a status of the door. In a fifth example of the system, optionally including one or more or each of the first through fourth examples, the automated door system is deactivated when the door of the vehicle is locked, partially available via the control buttons when a motor of the vehicle is started, and fully available when the door of the vehicle is unlocked and the vehicle control unit is in a standby mode. In a sixth example of the system, optionally including one or more or each of the first through fifth examples, hands-free unlocking and opening of the door and control of the door by the control buttons are each activated when the automated door system is fully available. In a seventh example of the system, optionally including one or more or each of the first through sixth examples, the RFID tag is configured to monitor the position of the key fob when the key fob is located external to the vehicle. In a eighth example of the system, optionally including one or more or each of the first through seventh examples, the photoelectric sensor is configured to monitor the position of the key fob when the key fob is located inside the vehicle.

The disclosure also provides support for a method for a vehicle, comprising: responsive to a key fob being within a threshold proximity of a door, detecting a position of the key fob relative to the door based on an RFID tag arranged on an exterior side of the door and a photoelectric sensor arranged on an interior side of the door, activating an automated door system of the vehicle according to the position of the key fob and a status of the vehicle, and adjusting a height of a vehicle floor and a status of the door based on the status of the vehicle. In a first example of the method, adjusting the height of the vehicle floor includes modifying the height upon detecting a request for stopping the vehicle. In a second example of the method, optionally including the first example, adjusting the height of the vehicle floor is based on at least one sensor input indicative of a desired vehicle floor height. In a third example of the method, optionally including one or both of the first and second examples, adjusting the height of the vehicle floor includes adjusting an adjustable suspension system of the vehicle. In a fourth example of the method, optionally including one or more or each of the first through third examples, adjusting the height of the vehicle floor includes adjusting the height between a nominal position and a kneeling position. In a fifth example of the method, optionally including one or more or each of the first through fourth examples, activating the automated door system includes confirming that the vehicle is in a stationary state and in one of the nominal position and the kneeling position.

The disclosure also provides support for a method for a vehicle, comprising: automatically unlocking and opening one or more doors of the vehicle based on a combination of a state of the vehicle, a mode of a vehicle control unit of the vehicle, and on a proximity of a key fob to any of the one or more doors. In a first example of the method, the method further comprises: unlocking and opening the one or more doors by pressing a push button at each of the one or more doors. In a second example of the method, optionally including the first example, automatically unlocking and opening the one or more doors based on the proximity of the key fob to any of the one or more doors includes detecting a position of the key fob by a set of sensors arranged at each of the one or more doors. In a third example of the method, optionally including one or both of the first and second examples, detecting the position of the key fob by the set of sensor includes monitoring the position of the key fob relative to an exterior of the vehicle by one or more RFID tags communicatively coupled to an RFID reader and monitoring the position of the key fob relative to an interior of the vehicle by one or more photoelectric sensors communicatively linked to the vehicle control unit. In a fourth example of the method, optionally including one or more or each of the first through third examples, automatically unlocking and opening the one or more doors includes adjusting a status of one or more of a driver side door, a rear door, and a bulkhead door of the vehicle.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an automatic door system of a vehicle, comprising:
    responsive to a key fob being within a threshold proximity of a door,
        detecting a position of the key fob relative to the door based on an RFID tag arranged on an exterior side of the door and a photoelectric sensor arranged on an interior side of the door;
        activating the automatic door system of the vehicle according to the position of the key fob and a status of the vehicle; and
        adjusting a height of a vehicle floor and another status of the door based on the status of the vehicle.

2. The method of claim 1, wherein adjusting the height of the vehicle floor includes modifying the height upon detecting a request for stopping the vehicle.

3. The method of claim 1, wherein adjusting the height of the vehicle floor is based on at least one sensor input indicative of a desired vehicle floor height.

4. The method of claim 1, wherein adjusting the height of the vehicle floor includes adjusting an adjustable suspension system of the vehicle.

5. The method of claim 1, wherein adjusting the height of the vehicle floor includes adjusting the height between a nominal position and a kneeling position.

6. The method of claim 5, wherein activating the automatic door system includes confirming that the vehicle is in a stationary state and in one of the nominal position and the kneeling position.

7. A method for operating an automatic door system of a vehicle, comprising:
    automatically unlocking and opening one or more doors of the vehicle based on a combination of a state of the vehicle, a mode of a vehicle control unit of the vehicle, and on a proximity of a key fob to any of the one or more doors, wherein automatically unlocking and opening the one or more doors includes adjusting a status of one or more of a driver side door, a rear door, and a bulkhead door of the vehicle.

8. The method of claim 7, further comprising unlocking and opening the one or more doors by pressing a push button at each of the one or more doors.

9. The method of claim 7, wherein automatically unlocking and opening the one or more doors based on the proximity of the key fob to any of the one or more doors includes detecting a position of the key fob by a set of sensors arranged at each of the one or more doors.

10. The method of claim 9, wherein detecting the position of the key fob by the set of sensors includes monitoring the position of the key fob relative to an exterior of the vehicle by one or more RFID tags communicatively coupled to an RFID reader and monitoring the position of the key fob relative to an interior of the vehicle by one or more photoelectric sensors communicatively linked to the vehicle control unit.

11. A method for operating an automatic door system of a vehicle, comprising:
    automatically unlocking and opening one or more doors of the vehicle based on a combination of a state of the vehicle, a mode of a vehicle control unit of the vehicle, and a proximity of a key fob to any of the one or more doors;
    wherein automatically unlocking and opening the one or more doors based on the proximity of the key fob to any of the one or more doors includes detecting a position of the key fob by a set of sensors arranged at each of the one or more doors, including monitoring the position of the key fob relative to an exterior of the vehicle by one or more RFID tags communicatively coupled to an RFID reader.

\* \* \* \* \*